(12) United States Patent
Nishida

(10) Patent No.: US 8,041,113 B2
(45) Date of Patent: Oct. 18, 2011

(54) IMAGE PROCESSING DEVICE, IMAGE PROCESSING METHOD, AND COMPUTER PROGRAM PRODUCT

(75) Inventor: Hirobumi Nishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1142 days.

(21) Appl. No.: 11/518,910

(22) Filed: Sep. 12, 2006

(65) Prior Publication Data

US 2007/0081179 A1    Apr. 12, 2007

(30) Foreign Application Priority Data

Oct. 7, 2005    (JP) ................................. 2005-295412

(51) Int. Cl.
*G06K 9/34* (2006.01)
*G06K 9/36* (2006.01)

(52) U.S. Cl. ......... 382/173; 382/176; 382/290; 382/292

(58) Field of Classification Search .................. 382/173, 382/176, 290, 292
See application file for complete search history.

(56) References Cited

U.S. PATENT DOCUMENTS

| | | | | |
|---|---|---|---|---|
| 5,634,064 | A | * | 5/1997 | Warnock et al. ............... 715/208 |
| 6,047,251 | A | * | 4/2000 | Pon et al. ........................... 704/1 |
| 6,393,145 | B2 | * | 5/2002 | Betrisey et al. ............... 382/162 |
| 2002/0025081 | A1 | * | 2/2002 | Kumazawa .................... 382/289 |
| 2004/0076327 | A1 | * | 4/2004 | Stern et al. ..................... 382/173 |
| 2007/0035780 | A1 | * | 2/2007 | Kanno ........................... 358/403 |

FOREIGN PATENT DOCUMENTS

| | | |
|---|---|---|
| CN | 1276077 A | 12/2000 |
| CN | 1604120 A | 4/2005 |
| JP | 2000-67158 A | 3/2000 |
| JP | 3187895 B2 | 5/2001 |
| JP | 2002-41498 A | 2/2002 |
| JP | 2004-102796 A | 4/2004 |
| JP | 2005-63419 A | 3/2005 |

OTHER PUBLICATIONS

Liang, J.—"Document layout structure extraction using bounding boxes of different entities"—IEEE—1996, pp. 278-283.*
Baird, Henry S., "Background Structure in Document Images", Document Image Analysis, 1994, pp. 17-34.
Breuel, Thomas M., "Two Geometric Algorithms for Layout Analysis", Proceedings of IAPR Workshop on Document Analysis Systems, 2002, pp. 1-12.

* cited by examiner

*Primary Examiner* — Bhavesh Mehta
*Assistant Examiner* — Bernard Krasnic
(74) *Attorney, Agent, or Firm* — Dickstein Shapiro LLP

(57) ABSTRACT

A first area extracting unit extracts a first document area from document image data by dividing the document image data in units of a document area. A language determining unit determines a type of a language used in the document image data. A second area extracting unit extracts a second document area by dividing or combining the first document area based on a rule corresponding to the type of the language determined by the language determining unit.

18 Claims, 28 Drawing Sheets

FIG. 2

| LANGUAGE | WRITING ORIENTATION | FONT SIZE | AREA EXTRACTING UNIT |
|---|---|---|---|
| JAPANESE | WITH-STREAM | SMALL | JAPANESE VERTICAL-WRITING CORRECTING UNIT |
| JAPANESE | CROSS-STREAM | SMALL | JAPANESE HORIZONTAL-WRITING CORRECTING UNIT |
| EUROPEAN LANGUAGE | – | SMALL | EUROPEAN-LANGUAGE CORRECTING UNIT |
| ARABIC | – | SMALL | ARABIC-LANGUAGE CORRECTING UNIT |
| ⋮ | ⋮ | ⋮ | ⋮ |

FIG. 11
BEFORE EXTRACTION
⇩ EXTRACTION BY FIRST AREA EXTRACTING UNIT
AFTER EXTRACTION
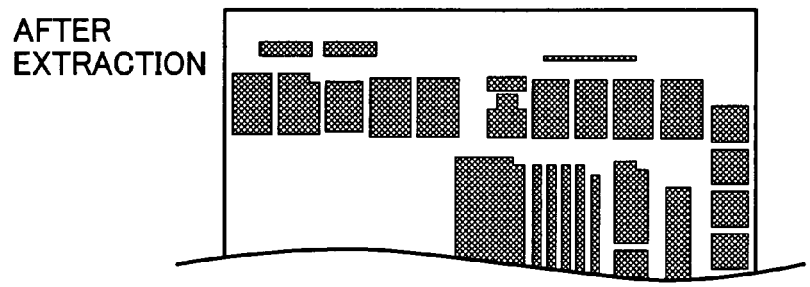
FIG. 12
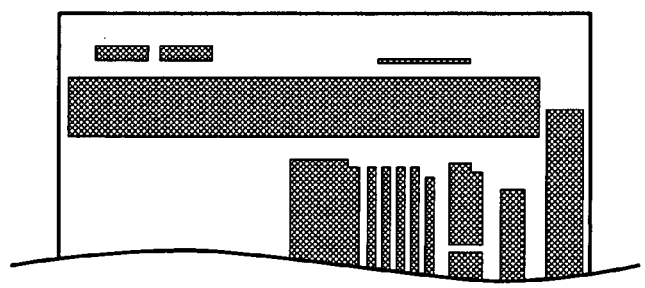

| PURPOSE APPLICATION | APPLICATION-SPECIFIC-AREA DIVIDING UNIT |
|---|---|
| JAPANESE OCR | JAPANESE OCR-AREA EXTRACTING UNIT |
| ⋮ | ⋮ |

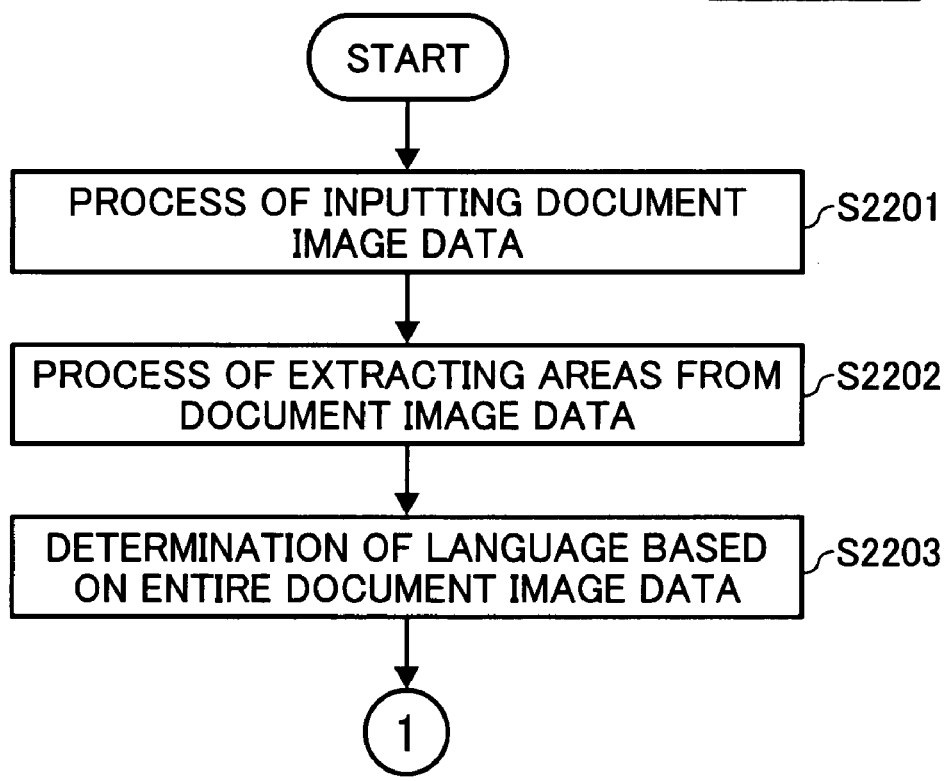

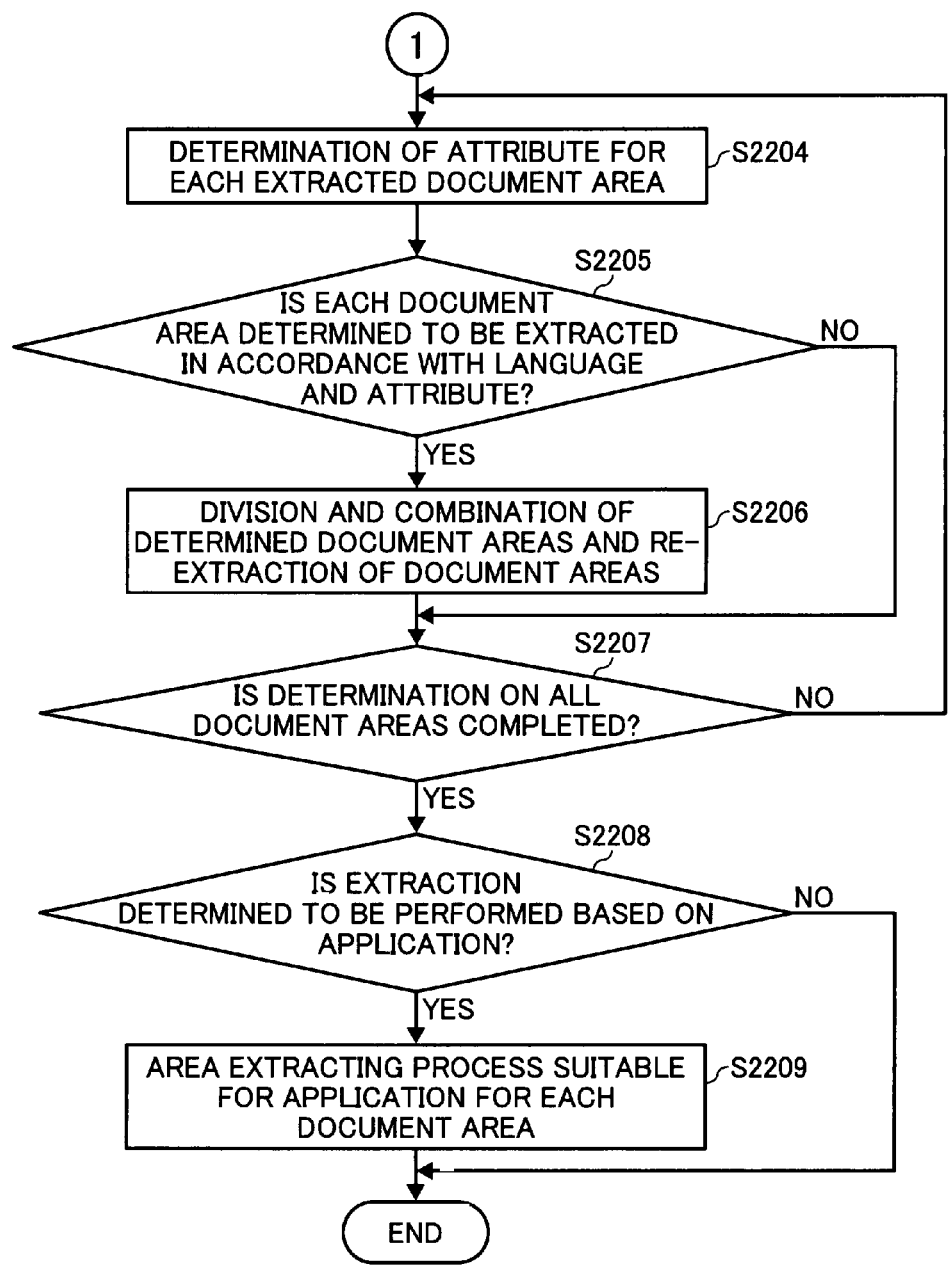

IMAGE PROCESSING DEVICE, IMAGE PROCESSING METHOD, AND COMPUTER PROGRAM PRODUCT

CROSS-REFERENCE TO RELATED APPLICATIONS

The present document incorporates by reference the entire contents of Japanese priority document, 2005-295412 filed in Japan on Oct. 7, 2005.

BACKGROUND OF THE INVENTION

1) Field of the Invention

The present invention relates to a technology for extracting an area that includes a character from image data.

2) Description of the Related Art

In general, a process of sorting a document image input into a computer through an image input device such as a scanner and a digital camera, into document constituent elements, namely character blocks, photographs/pictures/illustrations, tables, and ruling, is called "geometric layout analysis" or "page segmentation". The "geometric layout analysis" or "page segmentation" is often carried out onto a binary document image. In addition, "geometric layout analysis" or "page segmentation" is associated with, as preprocessing, "skew correction" in which a skew caused at the time of inputting is corrected. The "geometric layout analysis" or "page segmentation" of a binary document image that has been subjected to the skew correction is divided into two broad approaches (top-down analysis and bottom-up analysis).

Explanation of the top-down analysis will now be given. The top-down analysis breaks a page into large constituent elements, then into smaller constituent elements. This is an approach where larger constituent components are broken into smaller components; for example, a page is broken into columns, each column is broken into paragraphs, and each paragraph is broken into character lines. The top-down analysis is advantageous in facilitating calculation by using a model on the basis of assumption on a page layout structure (character lines in a Manhattan layout are upright rectangular, for example). If the assumption does not hold for the data, however, there is a drawback that a fatal mistake may be created. For a complicated layout, modeling also becomes complicated in most cases, and thus it is not easy to deal with such a layout.

Next, an explanation will be given on bottom-up analysis. In the bottom-up analysis, constituent elements are integrated by referring to positional relationship with adjacent elements, as described in Japanese Patent Application Laid-open No. 2000-067158 and Japanese Patent No. 3187895. This is an approach where smaller constituent elements are grouped under large elements; for instance, connected elements are put together into a line, and lines are put together into a column. Japanese Patent Application Laid-open No. 2000-067158 discloses a bottom-up analysis method that is based on local information. Although this can cope with various layouts without depending much on the assumption regarding the layout of the entire document image data, there is a drawback that locally made judgment errors may be accumulated. If two words across two different columns are mistakenly integrated into one character line, the two columns are mistakenly extracted as one column. Furthermore, the method of integrating constituent elements as disclosed in Japanese Patent No. 3187895 requires knowledge on features of character sequences and writing orientation (vertical-writing or horizontal-writing) for each language.

As explained above, the two approaches are complementary to each other, and some approaches are suggested in the efforts of filling the gap therebetween. Among these, there are approaches that are independent from differences in languages. These approaches include an approach that uses portions other than characters, i.e. "background" or so-called "white background" for binary document images. Advantages in use of background or white background are:

(1) Because it does not matter which language it is dealing with (white background is used as a breakpoint in most languages), knowledge on writing orientation (vertical-writing or horizontal-writing) is not required.

(2) It is broad processing, which is less likely to have local judgment errors accumulated.

(3) It can flexibly cope with complicated layouts.

Among such background analysis methods, the "maximum white-block group page segmentation" is a typical method.

The "maximum white-block group page segmentation" will be briefly explained here. Preparatory to this, the "maximum while block problem" will be defined. First, rb is assigned to indicate a block area corresponding to the entire document image data, and $C=[r0, r1, \ldots, rn]$(ricrb; i=0, 1, ..., n) is assigned to indicate a block area enclosing combined black components of a binary document image. An exemplary set of block areas is shown in FIG. 6. Further, an evaluation function Q that satisfies the property described below is introduced for blocks. Regarding two blocks r and r', the evaluation function satisfies:

if $r \subseteq r'$ then $Q(r) \leq Q(r')$

For instance, the above property is satisfied when the function $Q(r)$ is the area of the block r. The "maximum while block problem" is a problem of finding the maximum value for Q from among blocks that do not overlap with elements of C, r0, r1, ..., rn (ricrb; i=0, 1, ..., n). In the extension of this problem, H. S. Baird, "Background structure in document images" in Document Image Analysis (H. Bunke, P. S. P. Wang, and H. S. Baird, Eds.), Singapore: World Scientific, 1994, pp. 17-34 and T M Breuel, "Two algorithms for geometric layout analysis", in Proceedings of IAPR Workshop on Document Analysis Systems (Princeton, N.J., USA), 2002 suggest an algorithm for providing values of Q in descending order regarding the "maximum white-blocks", i.e. white-blocks that would overlap with any of the C elements if they are expanded any further.

By covering the background area (blank area of the binary document image) with a group of maximum white-blocks in a manner as described above, it is expected that document constituent elements such as columns and text lines can be extracted as "portions uncovered by any of the white-blocks".

However, the methods that belong to the background analysis such as the "maximum white-block group page segmentation" have a drawback that it is difficult to deal with complicated layouts specific to a language.

SUMMARY OF THE INVENTION

It is an object of the present invention to at least partially solve the problems in the conventional technology.

An image processing device according to one aspect of the present invention includes a first area extracting unit that extracts a first document area from document image data by dividing the document image data in units of a document area; a language determining unit that determines a type of a language used in the document image data; and a second area extracting unit that extracts a second document area by dividing or combining the first document area based on a rule corresponding to the type of the language determined by the language determining unit.

An image processing method according to another aspect of the present invention includes extracting a first document area from document image data by dividing the document image data in units of a document area; determining a type of a language used in the document image data; and extracting a second document area by dividing or combining the first document area based on a rule corresponding to the type of the language determined at the determining.

A computer program product according to still another aspect of the present invention includes a computer usable medium having computer readable program codes embodied in the medium that when executed causes a computer to execute extracting a first document area from document image data by dividing the document image data in units of a document area; determining a type of a language used in the document image data; and extracting a second document area by dividing or combining the first document area based on a rule corresponding to the type of the language determined at the determining.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a diagram for explaining the structure of the extraction rule correspondence table stored in the storing unit of the image processing device according to the first embodiment;

FIG. 11 is a diagram of an example of document image data including large fonts extracted by the first area extracting unit;

FIG. 12 is a diagram for explaining an example of a result of the large-font correcting unit according to the first embodiment combining document areas and re-extracting document areas;

FIGS. 23A-23B is a flow chart for explaining the procedure of a process of inputting document image data through a process of extracting document areas from the document image data performed by the image processing device according to the third embodiment;

DETAILED DESCRIPTION OF THE PREFERRED EMBODIMENTS

Exemplary embodiments of the present invention will be explained below in detail with reference to the accompanying drawings.

Figure 1:
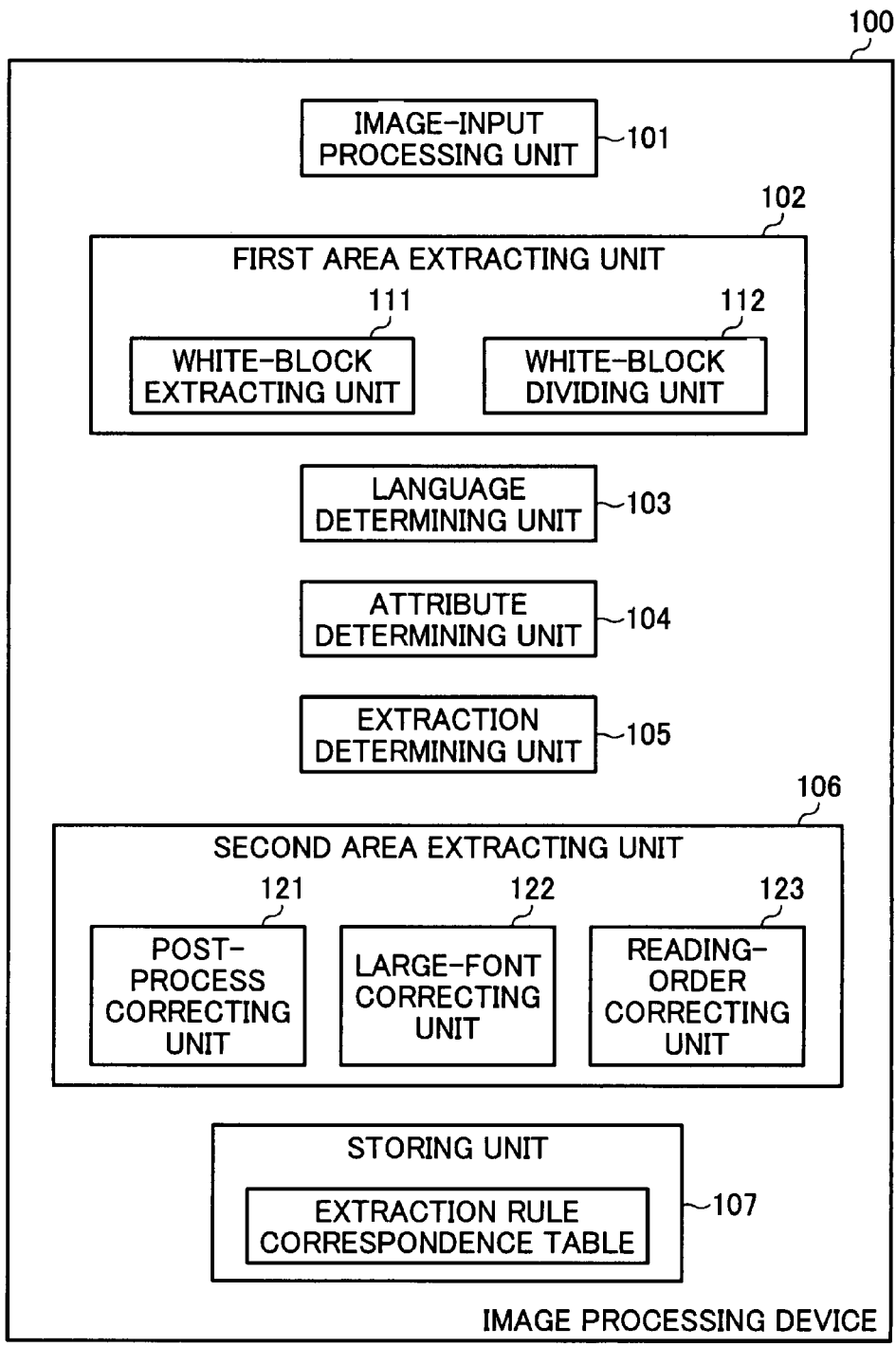
FIG. 1 is a block diagram of the structure of an image processing device according to a first embodiment of the present invention.

FIG. 1 is a block diagram of the structure of an image processing device according to the first embodiment of the present invention. As illustrated in this drawing, an image processing device 100 houses an image-input processing unit 101, a first area extracting unit 102, a language determining unit 103, an attribute determining unit 104, an extraction determining unit 105, a second area extracting unit 106, and a storing unit 107. The image processing device 100 carries out layout analysis processing onto the input and processed image data to extract areas that include character strings.

The storing unit 107 includes a database. In addition, the storing unit 107 stores an extraction rule correspondence table in this database. The storing unit 107 is a storing means of general use, which may be constituted with an HDD, an optical disk, a memory card, and the like.

FIG. 2 is a diagram for explaining the structure of the extraction rule correspondence table. As shown in this drawing, the extraction rule correspondence table stores the relationship of languages, writing orientations, font sizes, and the area extraction units. The area extraction units indicate structural components included in the second area extracting unit 106, which will be explained later. The structural components of the second area extracting unit 106 divide or combine areas included in image data in compliance with a specific rule to extract areas with character strings. In other words, the extraction rule correspondence table stores a process feasible at the second area extracting unit 106 in association with languages and attributes (writing orientation and font size). The use of the extraction rule correspondence table will be explained in detail later.

The image-input processing unit 101 performs an input process on image data. The image-input processing unit 101 according to the present embodiment performs binarization on the image data during the input process to generate binary image data. Any image data can be subjected to the input process of the image-input processing unit 101. For instance, the image-input processing unit 101 may perform the input process onto image data connected to the image processing device 100, which is not shown, or onto image data received from another device via a network.

In other words, the image data subjected to the input process is not limited to black-and-white, but it can be a color or gray image. When the image is color or gray, preprocessing such as binarization described above is provided. Then, the image data subjected to the binarization for the input process undergoes a skew correction and has characters displayed as black pixels, without losing generality.

Figure 3:
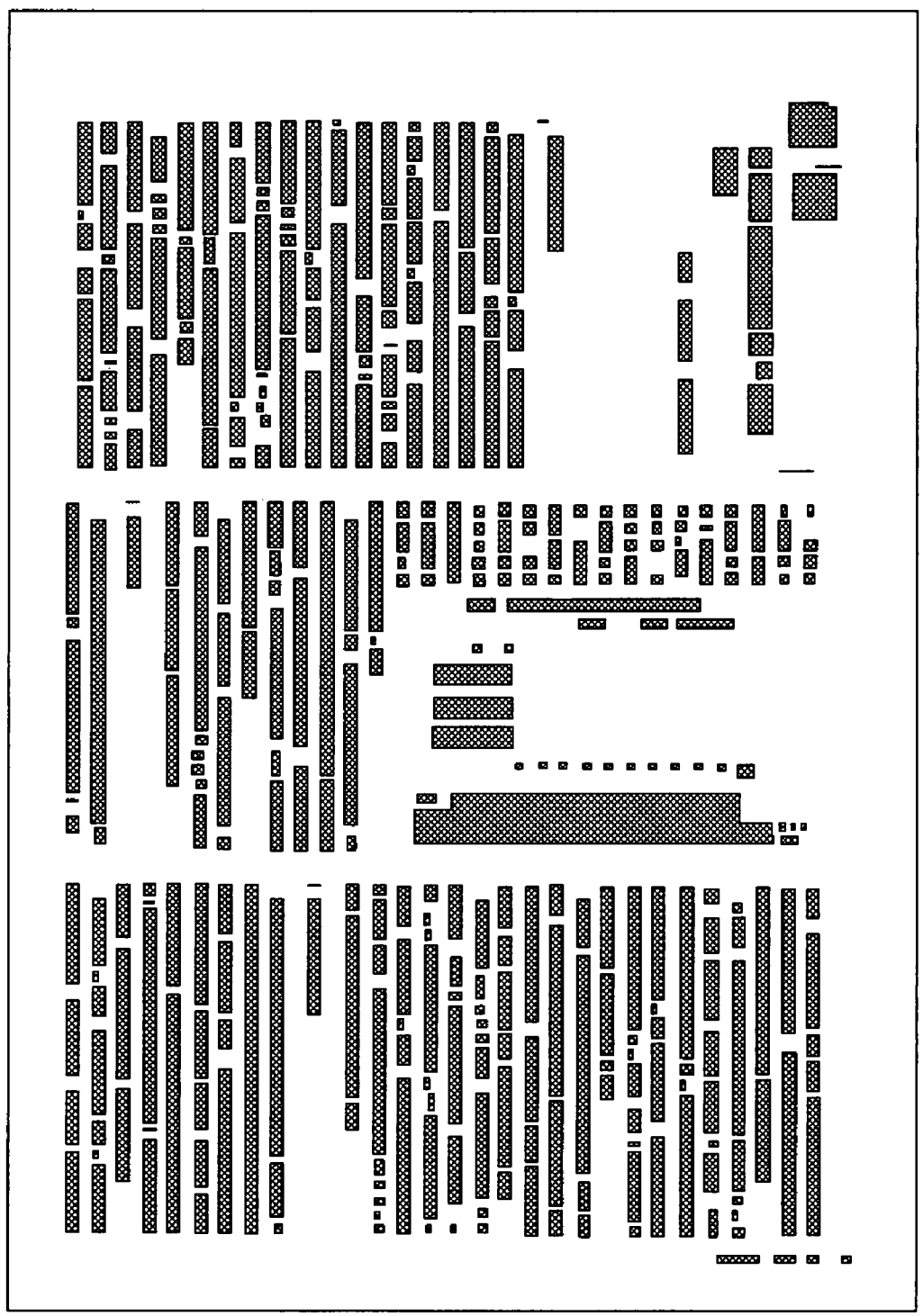
FIG. 3 is a diagram of an example of binarized image data subjected to an input process by the image-input processing unit of the image processing device according to the first embodiment.

FIG. 3 is a diagram of an example of binarized image data on which the image-input processing unit 101 has performed an input process. Text portions are blacked out in this drawing. Similarly to the binarized image data in the drawing, the image data including character strings is to be extracted area by area by the image processing device 100 according to the present embodiment (hereinafter, "document image data" for the image data that includes such character strings).

The first area extracting unit 102 comprises a white-block extracting unit 111 and a white-block dividing unit 112. The first area extracting unit 102 divides the document image data subjected to the input process by the image-input processing unit 101, into specific groups of character strings such as columns, and extracts areas (hereinafter, "document areas"). The first area extracting unit 102 may adopt any area extracting procedure as long as the technique is to divide the document image data and extract document areas regardless of the language that is used. The area extracting method may be, for example, a method that belongs to background analysis. According to the present embodiment, the first area extracting unit 102 extracts document areas after executing division by the "maximum white-block group page segmentation".

The white-block extracting unit 111 extracts maximum white-block groups from the document image data or from document areas that has undergone the division by the white-block dividing unit 112, which will be described later.

Figure 4:
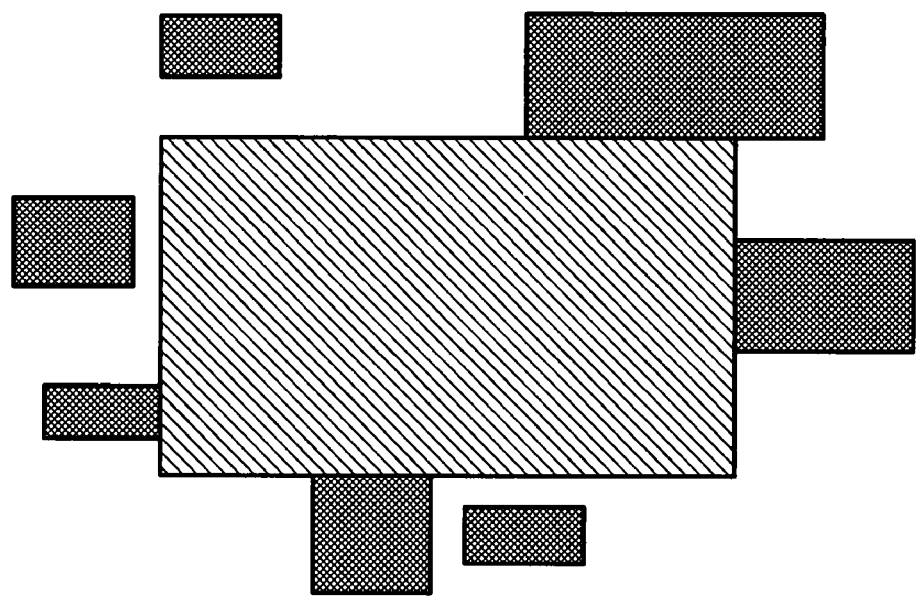
FIG. 4 is a diagram for explaining an example of a maximum white-block.

FIG. 4 is a diagram for explaining an example of a maximum white-block. The black blocks in this drawing are block areas that precisely enclose combined black components of the binary document image. The maximum white-block, which would overlap with these block areas if expanded any further, are indicated as a screened block in the drawing.

The white-block dividing unit 112 divides the document image data or a document area including the maximum white-block group extracted by the white-block extracting unit 111, into several document areas by use of the maximum white-block group as a separator. By repeating the processes at the white-block extracting unit 111 and the white-block dividing unit 112, the document image data is divided, and thereby document areas are extracted.

Figure 5:
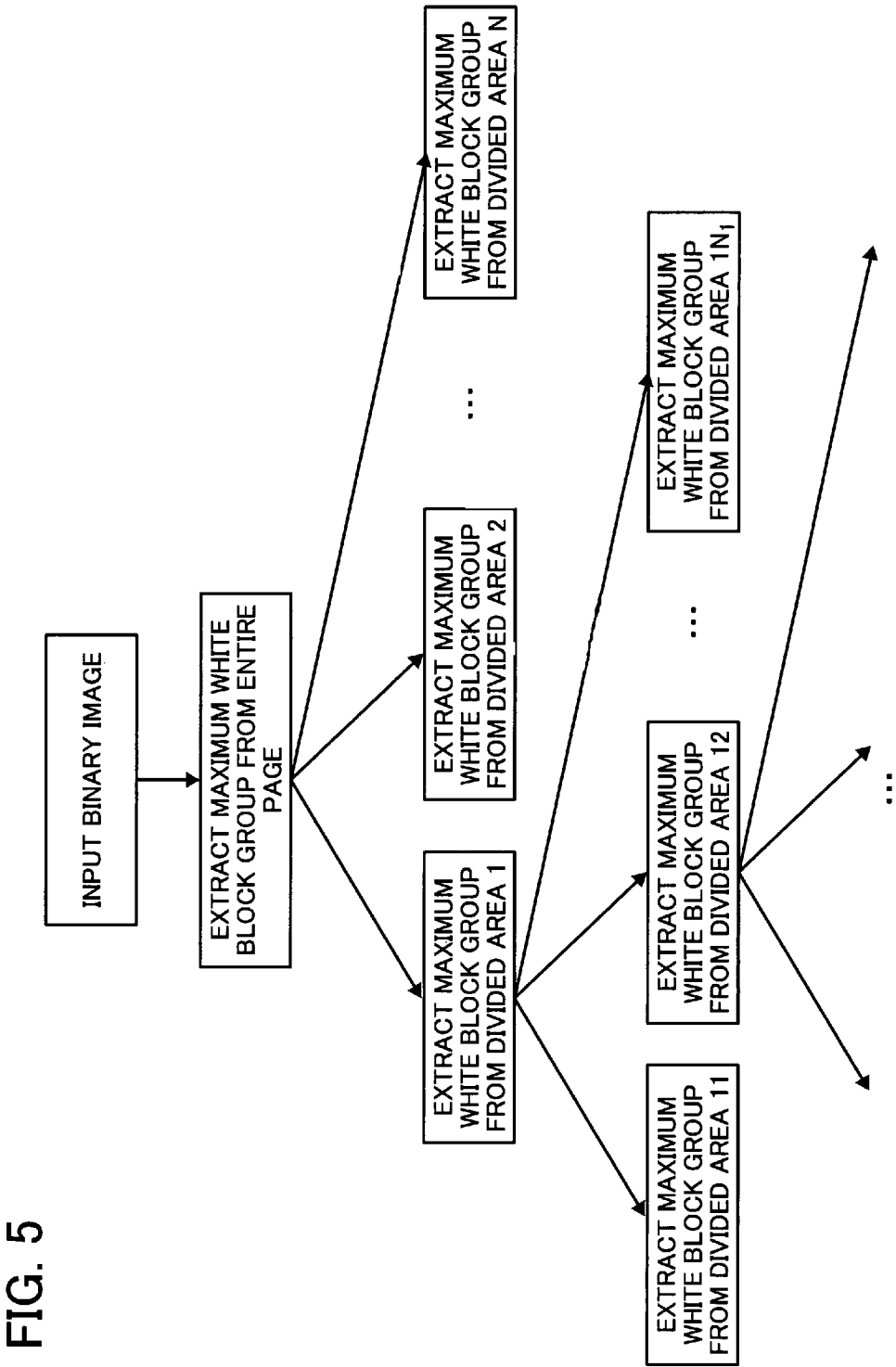
FIG. 5 is a diagram for schematically explaining the fundamental approach of the layout analysis process adopting maximum white-block group page segmentation.

FIG. 5 is a diagram for schematically explaining the fundamental approach of the layout analysis process adopting the maximum white-block group page segmentation. As illustrated in this drawing, a hierarchical process is executed through recursive divisions of the document image data from a rougher level to a finer level by use of the maximum white-block group page segmentation. This increases the efficiency of the process.

The overview of the page segmentation with the maximum white-block groups will now be given. First, the white-block extracting unit 111 gives a low value to the lower limit for the condition of terminating the maximum white-block group extraction from the entire document image data to perform the process on a rough scale. White-block groups are thereby extracted. The white-block dividing unit 112 uses the extracted white-block groups as separators to divide the entire document image data into several document areas.

Next, the white-block extracting unit 111 narrows down the lower limit of the condition of terminating the maximum white-block group extraction, and executes the maximum white-block group extraction again on the document areas obtained by the division. The white-block dividing unit 112 then refines the division by using the extracted maximum white-block groups. Such processes are recursively carried out. The lower limit for the condition of terminating the maximum white-block group extraction in the hierarchical processing may be configured in accordance with the size of a document area. In addition to the lower limit for the condition of terminating the maximum white-block group extraction, constraints in relation to a preferable shape or size of a white-block may be introduced. For instance, white-blocks that are not suitable as separators of document areas may be eliminated. The white-blocks that are not suitable as separators of document areas have to be eliminated because a block with a small length or a small width could possibly be spacing between characters. Such constraints in association with length and width may be determined in accordance with the presumed font size of characters used in the document areas. The procedure of the page segmentation with the maximum white-block groups will be described later.

With the first area extracting unit 102 recursively performing the extraction of the maximum white-block groups and the division of the document areas, hierarchical processing is realized in the document area extracting process, through recursive divisions from a rough scale to a finer scale. Hence, high efficiency can be achieved in the layout analyzing process.

The language determining unit 103 determines the language of the entire document image data. The procedure of determining the language may be any procedure; for example, it may be automatically performed or input by a user. The language determining unit 103 according to the present embodiment is designed to automatically determine the language. Any technique can be adopted also for the automatic language determination. The language determining unit 103 adopts a known technique described in Japanese Patent Application Laid-open No. 2005-063419.

Figure 6:
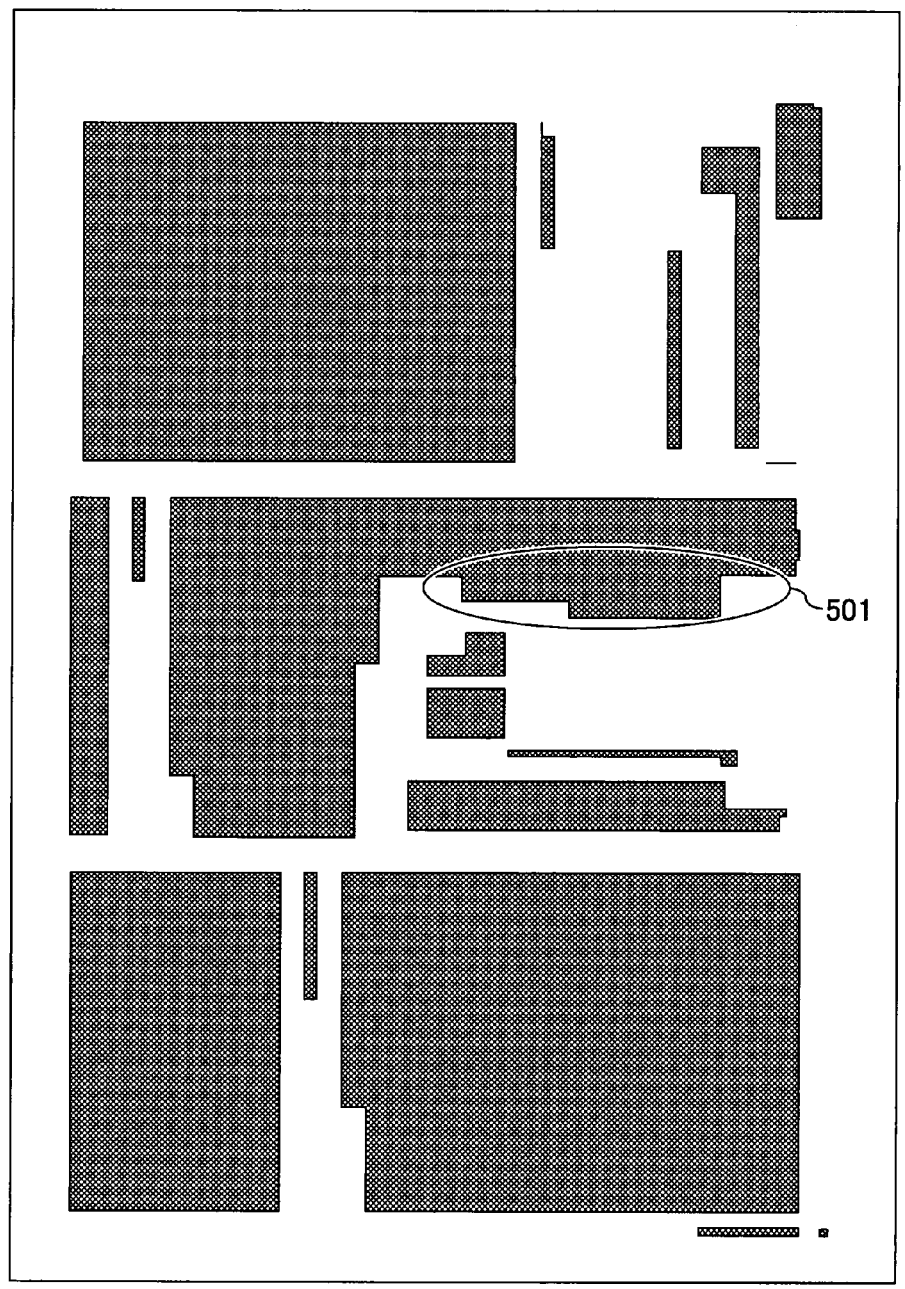
FIG. 6 is a diagram for explaining an example of the result of area extraction by the first area extracting unit according to the first embodiment.

Next, the importance of language determination will be explained. FIG. 6 is a diagram for explaining an example of the result of area extraction by the first area extracting unit 102 according to the present embodiment. A document area 501 marked with an oval in this drawing includes two document areas of different writing orientations because spacing between the vertical-writing paragraph and the horizontal-writing paragraph is small. Such a phenomenon is inherent in languages such as Japanese, which employ both vertical-writing and horizontal-writing writing, but it does not occur in European languages, which employ horizontal-writing writing only. Although this problem may be solved by incorporating an exceptional process, a possibility of unexpected setback cannot be denied. That is, a process specific and specialized for each language will be required to make the device adaptable to complicated, language-specific layouts. Hence, according to the present embodiment, the language determining unit 103 is designed to make language determination.

In addition, the language determining unit 103 makes language determination from the entire document image data, which means that the language is determined based on a large amount of text information. This allows for highly accurate language determination.

The attribute determining unit 104 determines attributes for each document area extracted by the first area extracting unit 102. Any attributes can be used for the determination. According to the present embodiment, a writing orientation and a font size are adopted as attributes. Further, any known technique for determining the writing orientation or fond size can be adopted. The attribute determining unit 104 according to the present embodiment uses a known technique of determining the writing orientation disclosed in Japanese Patent No. 3220226 or Japanese Patent Application Laid-open No. 2000-113103 to determine the writing orientation.

Figure 7:
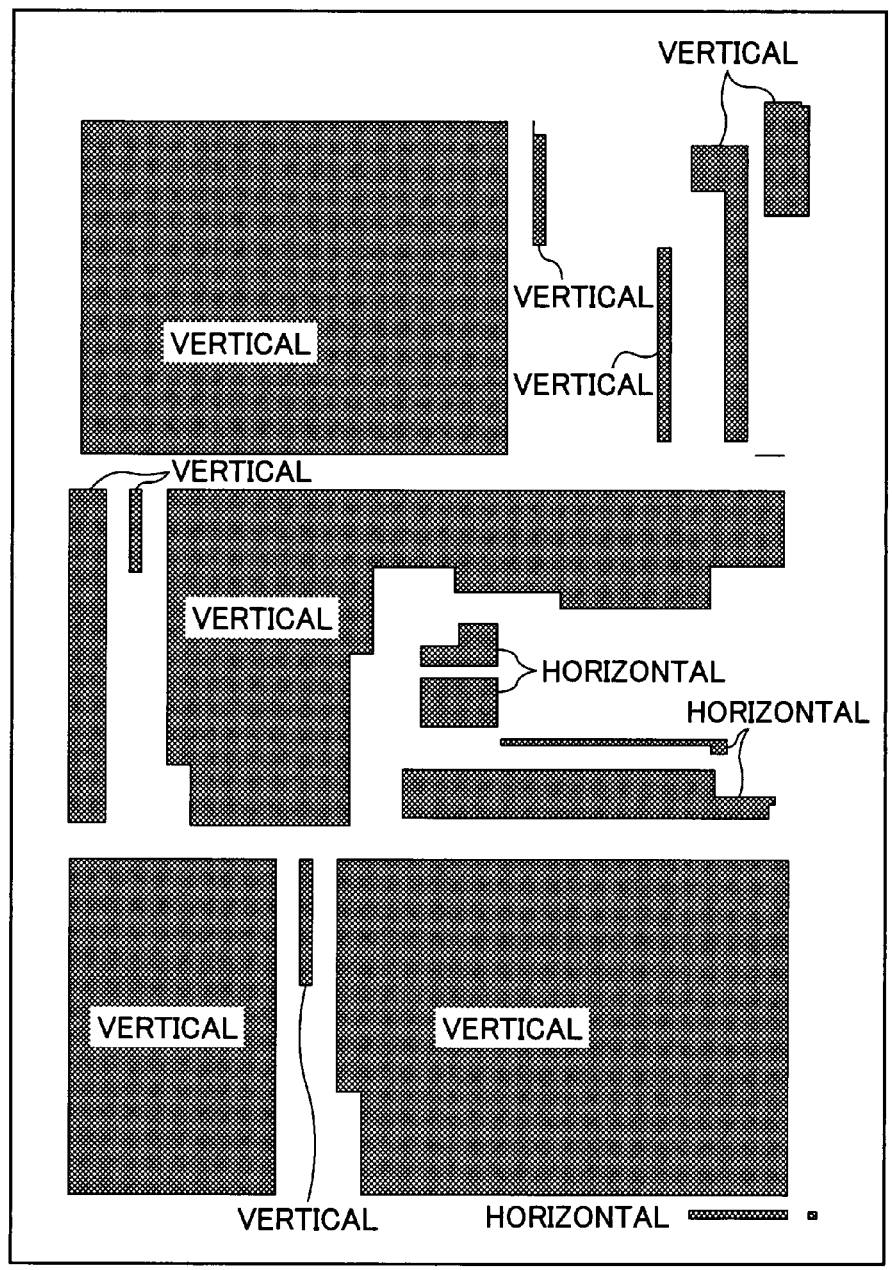
FIG. 7 is a diagram for explaining an example of the result of the writing orientation determination performed on the area-divided document image data.

FIG. 7 is a diagram for explaining an example of the result of the writing orientation determination performed on the area-divided document image data by the attribute determining unit 104 according to the present embodiment. The document image data subjected to the writing orientation determination illustrated in this drawing is the same as the document image data illustrated in FIG. 6. The attribute determining unit 104 makes determination also on the font size for each extracted document area, in a similar manner to the writing orientation, although it is not shown.

The extraction determining unit 105 determines whether to perform a further extracting process onto each extracted document area in accordance with the language and the attributes of the document area. According to the present embodiment, the extraction determining unit 105 determines whether to carry out the extraction, by a search through the extraction rule correspondence table stored in the storing unit 107 to find whether there is a corresponding record by use of the language determined by the language determining unit 103 and the writing orientation and the font size determined by the attribute determining unit 104 as keys. Then, the extraction determining unit 105 determines to execute an extracting process when a corresponding record is present. The number of corresponding records to be found by the extraction determining unit 105 is not limited to one and may be more than one. If this is the case, the second area extracting unit 106, which will be described later, executes multiple processes.

By designing the extraction determining unit 105 to determine whether to perform extraction, the extracting process is performed in accordance with languages and attributes only when it is necessary. Hence, the load on the extracting process can be reduced.

One determination example by the extraction determining unit 105 is that a record of a "Japanese vertical-writing correcting unit" is found from the extraction rule correspondence table by the extraction determining unit 105 when the language is Japanese, the writing orientation of the document area is vertical-writing, and the font size is smaller than a predetermined size. In response, the Japanese vertical-writing correcting unit of the second area extracting unit 106, which will be described later, carries out an extracting process onto this document area. In other words, in the determination as to whether to extract document areas, the extracting process is executed at the second area extracting unit 106 when a corresponding record is present in the extraction rule correspondence table, and is otherwise not executed. According to the present embodiment, the determination of extraction is not limited to the use of such an extraction rule correspondence table, and any criteria can be configured for the determination of extraction.

Further, according to the present embodiment, the determination of the extracting process is based on the language and the attributes of the extracted document area, but the determination of the extracting process may be made by use of at least one of the language and the attributes of the extracted document areas. In another example, the determination of the extraction may be made for each area, or for the entire document image data, when the determination is made on the basis of the language only.

The second area extracting unit 106 includes a post-process correcting unit 121, a large-font correcting unit 122, and a reading-order correcting unit 123. The second area extracting unit 106 divides or combines the document areas for which the extraction determining unit 105 has determined to perform extraction, in accordance with languages and attributes, and extracts document areas.

Figure 8:
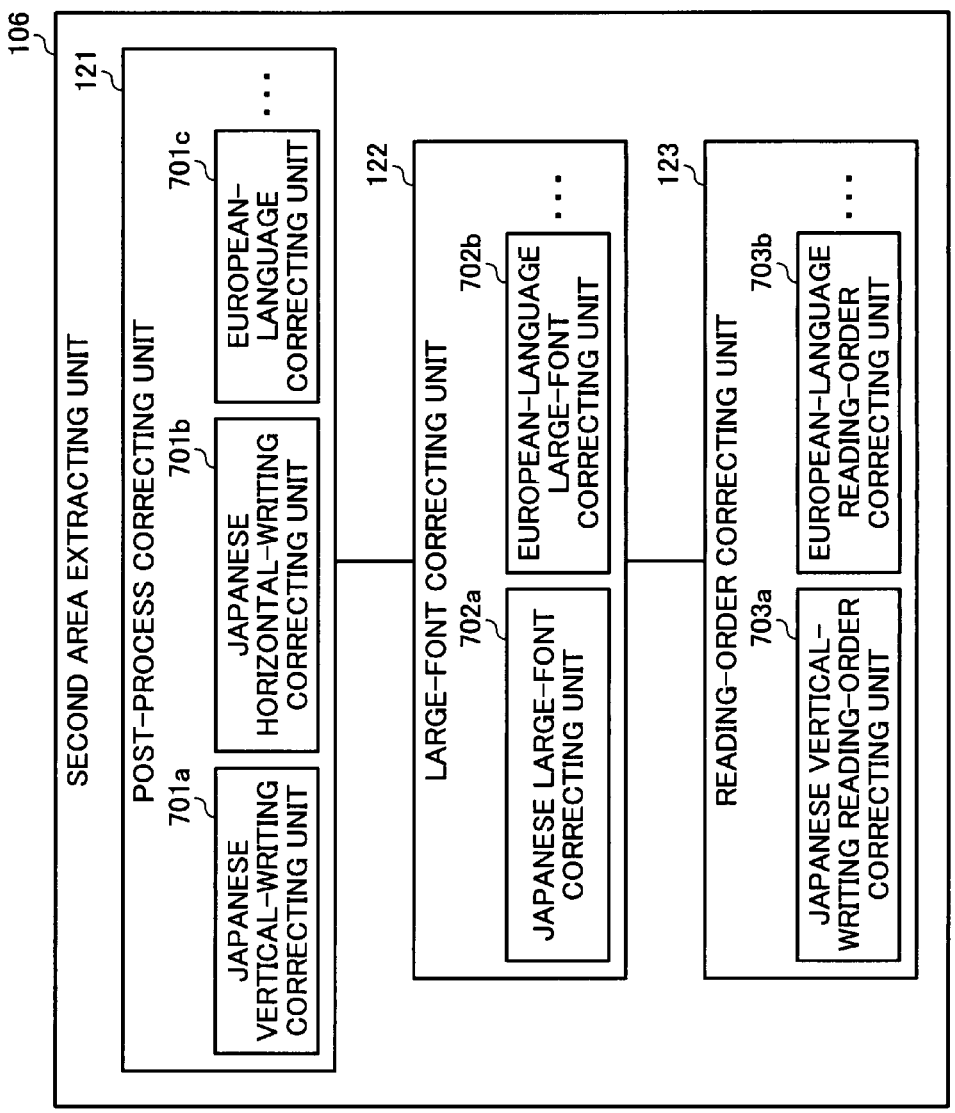
FIG. 8 is a block diagram of the structure of the second area extracting unit according to the first embodiment.

FIG. 8 is a block diagram of the structure of the second area extracting unit 106. As illustrated in this drawing, the second area extracting unit 106 executes processes at the post-process correcting unit 121, the large-font correcting unit 122, and the reading-order correcting unit 123, in this order. Then, among the components included in each of the post-process correcting unit 121, the large-font correcting unit 122, and the reading-order correcting unit 123, a component that is held in the "area extracting unit" field of the corresponding record determined by the extraction determining unit 105, as described above, performs the process.

The extraction determining unit 105 determining whether to extract a document area of which language is "Japanese", whose writing orientation is "vertical-writing", and whose font size is "smaller" than a predetermined size, will be explained. The extraction determining unit 105 searches the record of the "Japanese vertical-writing correcting unit" from the extraction rule corresponding table. Then, the extraction determining unit 105 determines to perform extraction at the second area extracting unit 106. In response, a Japanese vertical-writing correcting unit 701*a* of the second area extracting unit 106, which is a component held in the found record, divides or combines the document area to carry out the area extraction.

The post-process correcting unit 121 includes components that are necessary to execute correcting processes after the extracting process of the first area extracting unit 102, such as the Japanese vertical-writing correcting unit 701*a*, a Japanese horizontal-writing correcting unit 701*b*, and a European-language correcting unit 701*c*.

The components that are necessary to execute correcting processes after the extracting process of the first area extracting unit 102, such as the Japanese vertical-writing correcting unit 701*a*, the Japanese horizontal-writing correcting unit 701*b*, and the European-language correcting unit 701*c* may perform any known correcting processes for individual languages.

The post-process correcting unit 121 performs necessary processes in accordance with languages and attributes after the extracting process of the first area extracting unit 102. For instance, in a document area where the language has been determined as "Japanese", and the writing orientation has been determined as "vertical-writing", character strings whose writing orientation is "horizontal-writing" may be included as indicated by the document area 501 in FIG. 6. On the other hand, character strings whose writing orientation is "vertical-writing" may be included in a document area whose writing orientation has been determined as "horizontal-writing". The components included in the post-process correcting unit 121 perform area division onto such a document area, and thus the document area extraction can be further suitably achieved.

Figure 9:
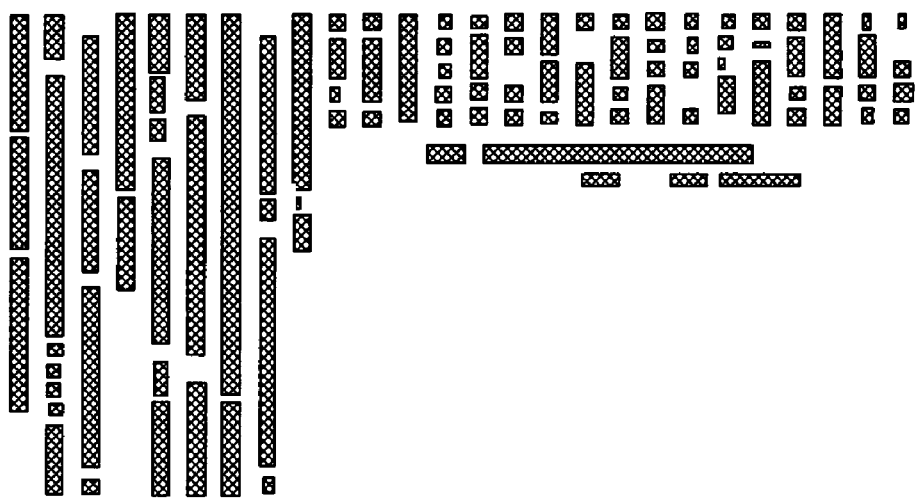
FIG. 9 is a diagram for explaining an example of a document area subjected to the area extraction at the Japanese vertical-writing correcting unit according to the first embodiment.

FIG. 9 is a diagram for explaining an example of a document area subjected to the area extraction at the Japanese vertical-writing correcting unit 701*a*. The document area described in the figure shows actual character strings in the document area 501 of FIG. 6. In other words, the document area extracted by the first area extracting unit 102 includes horizontal-writing character strings among vertical-writing character strings. The Japanese vertical-writing correcting unit 701*a* obtains vertical projection of the document area whose writing orientation is determined as vertical-writing, and carries out re-extraction when a zone with projection values being consecutively other than 0 satisfies specific requirements. This allows the extraction to be performed when the document area whose writing orientation is vertical-writing includes a horizontal-writing document area. The processing procedure will be described in detail later.

Figure 10:
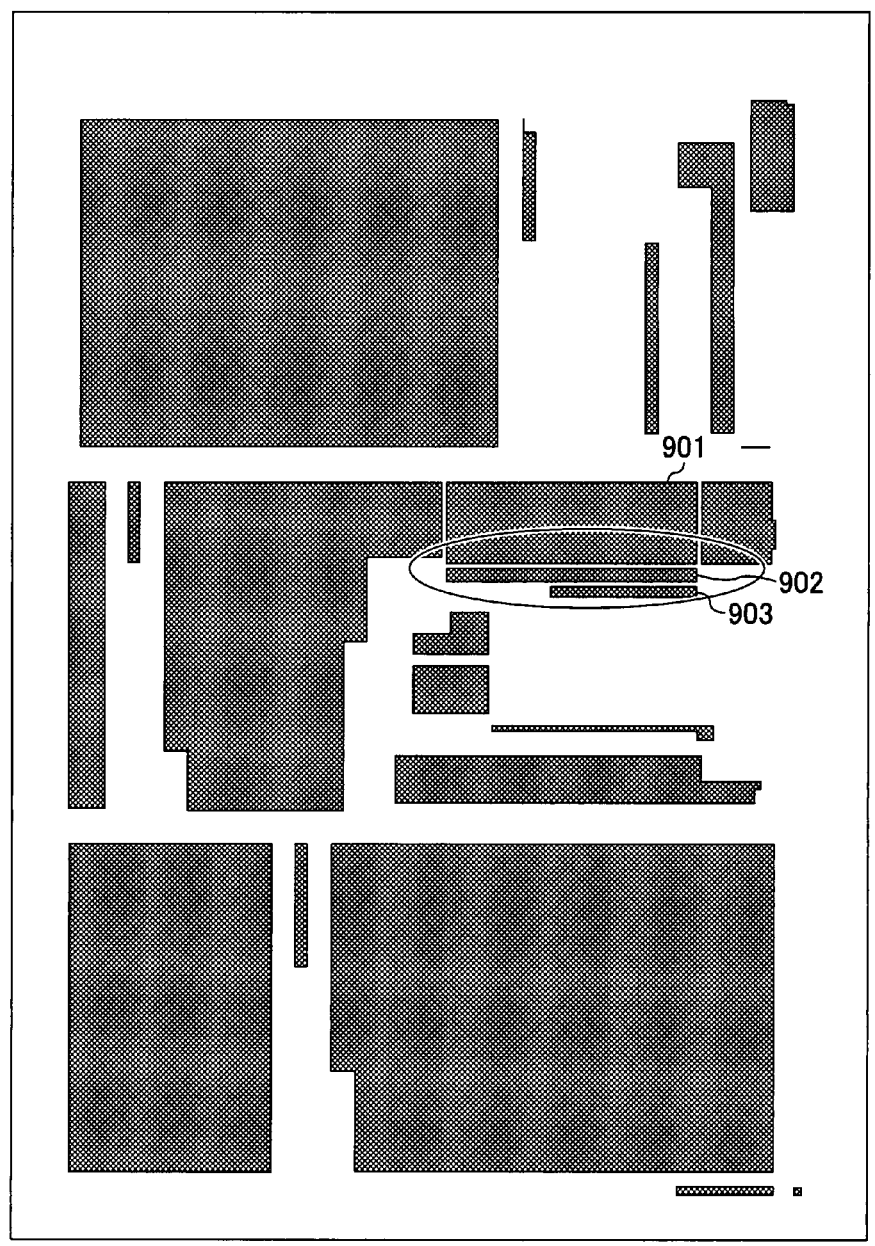
FIG. 10 is a diagram for explaining the result of the extracting process performed on each document area by the post-process correcting unit such as the Japanese vertical-writing correcting unit according to the first embodiment.

FIG. 10 is a diagram for explaining the result of the extracting process performed on each document area by the post-process correcting unit 121 such as the Japanese vertical-writing correcting unit 701*a*. As illustrated in this drawing, the Japanese vertical-writing correcting unit 701*a* is capable of extracting a vertical-writing document area 901, a horizontal-writing document area 902, and a horizontal-writing document area 903.

The portion in the oval in FIG. 10 has been judged as a single document area at the time of the area extraction in accordance with the "maximum white-block group page segmentation" illustrated in FIG. 6, with a space between the vertical-writing paragraph and the horizontal-writing paragraphs too narrow to extract as document areas of different writing orientations. In the language-dependent post-process performed at the post-process correcting unit 121, however, such as the Japanese vertical-writing correcting unit 701*a*, the extraction of document areas of different writing orientations are realized.

The large-font correcting unit 122 includes components that perform necessary processes for different languages, such as a Japanese large-font correcting unit 702*a* and a European-language large-font correcting unit 702*b*, when the font size is large.

Further, the large-font correcting unit 122 corrects the ranges of document areas that include fonts larger than a predetermined size.

The importance of correcting the ranges of document areas will be explained. Some documents adopt a large font for headlines, for instance. Unlike character clusters that constitute paragraphs and columns, the document area extraction for large-font characters is difficult to be suitably conducted without using language-dependent rules. This is because it is difficult to statistically estimate the font size, character spacing, and the like of a headline that is composed of fewer words; fonts used for headlines are likely to be confused with diagrams and photographs; and the word structure and the order of character strings vary depending on individual languages.

FIG. 11 is a diagram of an example of document image data including large fonts extracted by the first area extracting unit 102. As shown in this drawing, a headline in a large font may not be extracted as a single document area of a headline but as document areas of individual characters.

Then, a component of the large-font correcting unit 122 provided for each language such as the Japanese large-font correcting unit 702*a* corrects the document areas that include characters in a large font to a document area of a suitable range. With such components, the ranges of document areas having large-font characters can be corrected in compliance with appropriate rules defined for each language. The procedure of correcting document areas will be described later.

In addition, the large-font correcting unit 122 generates a document area that include appropriate characters, even when a single character is extracted as more than one area for its multiple constituent elements (for instance, a left element and a right element of a Chinese character) owing to its large font, by combining the elements. Any known combining means may be employed for combining such constituent elements.

As for a structure for a correcting process such as a European-language large-font correcting unit 702*c* may perform any known correcting process necessary for each language. This enables the European-language large-font correcting unit 702*c* or the like to combine characters that have been extracted as individual document areas due to their large font, into one segment, thereby achieving suitable document area extraction.

FIG. 12 is a diagram for explaining an example of a result of the large-font correcting unit 122 combining document areas and re-extracting document area. In this example of the result, a process is performed onto the document image data illustrated in FIG. 11. As shown in this drawing, after a single character divided into multiple document areas is put back together, the document areas of individual characters in large fonts for headlines and the like are combined and extracted as a single document area.

The reading-order correcting unit 123 includes components that perform necessary processes based on the reading order for each language, such as a Japanese vertical-writing reading-order correcting unit 703a and a European language reading-order correcting unit 703b.

Each of the components that are provided for individual languages in the reading-order correcting unit 123 combines and divides document areas based on the reading order specified for the individual languages to extract document areas. For instance, when multiple document areas are generated due to a wide line spacing therebetween but are judged as being connected to one another in consideration of the reading order of these document areas, the Japanese vertical-writing reading-order correcting unit 703a combines these document areas and newly extracts as a document area. In other words, the elements of the reading-order correcting unit 123 for different languages may extract suitable document areas through division and combination on the basis of the reading order. Any known process may be adopted for each of the components of the reading-order correcting unit 123 to judge the reading order.

After the extraction of document areas performed by the first area extracting unit 102 in a manner independent from languages and tasks, the language determining unit 103 determines the language of the document image, and the attribute determining unit 104 determines the attributes; thereafter, a post-process or a correction specific to the language and the attributes of each document area is carried out. The image processing device 100 can thereby extract document areas through division or combination in accordance with individual languages and the attributes of individual document areas, allowing for the area extraction applicable to unique, complicated layouts. As a result, the efficiency and the accuracy can be enhanced in the layout analysis process for document image data.

Figure 13:
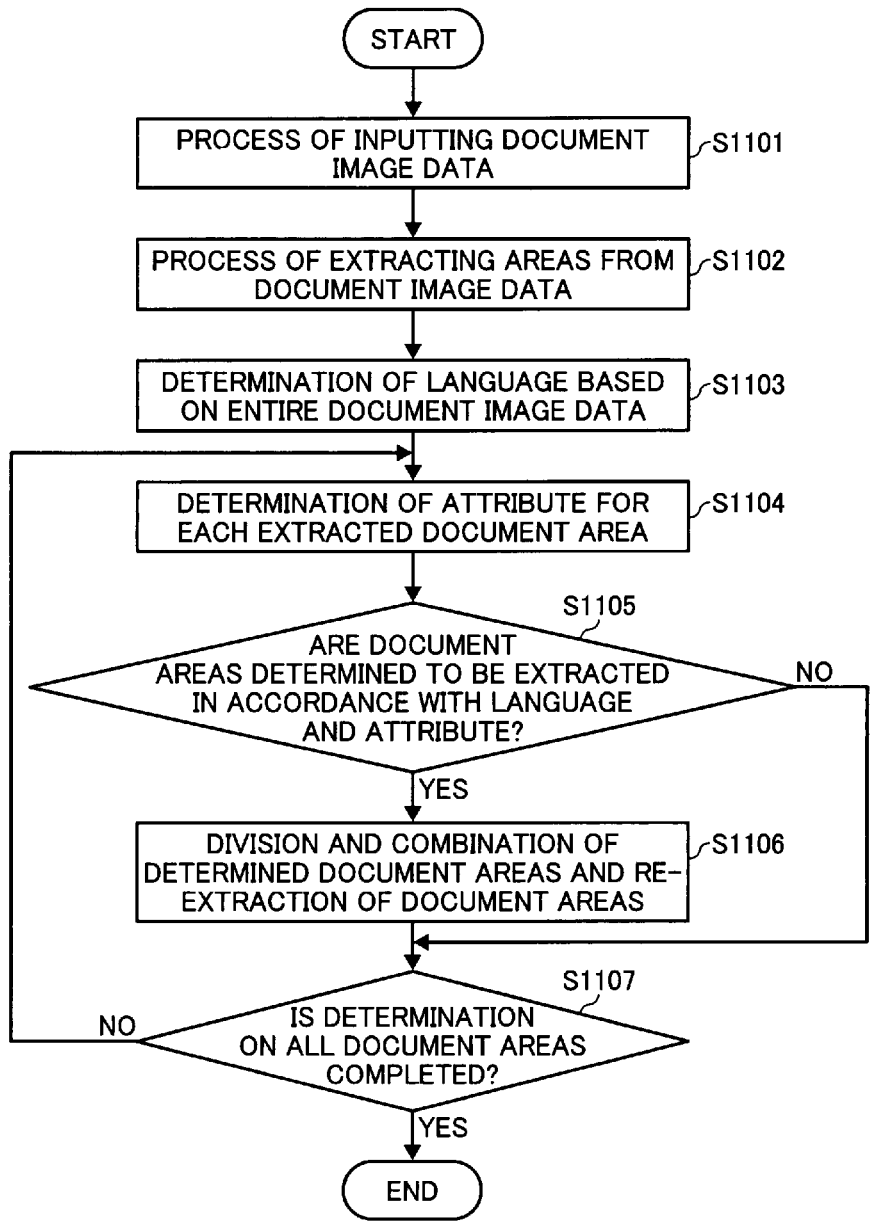
FIG. 13 is a flow chart for explaining the procedure of the process of inputting the document image data through the process of extracting document areas from the document image data at the image processing device according to the first embodiment.

Next, the procedure of the processes executed by the image processing device 100 as designed above according to the present embodiment, from the process of inputting document image data to the process of extracting document areas from the document image data, will be explained. FIG. 13 is a flow chart for explaining the procedure of the processes at the image processing device 100 according to the present embodiment.

First, the image-input processing unit 101 performs an input process onto the document image data and a binarizing process on the document image data subjected to the input process (Step S1101).

Next, the first area extracting unit 102 divides the document image data, which has been subjected to the input process, in accordance with the "maximum white-block group page segmentation" and extracts each document area (Step S1102).

Then, the language determining unit 103 determines the language from the entire document image data that has been subjected to the input process (Step S1103).

Thereafter, the attribute determining unit 104 determines the attributes (the writing orientation or the font size) of each extracted document area (Step S1104).

Then, the extraction determining unit 105 determines whether to extract the document area in accordance with the language determined by the language determining unit 103 and the attributes of the document area determined by the attribute determining unit 104 (Step S1105). The extraction determining unit 105 uses the extraction rule correspondence table stored in the storing unit 107 when determining whether to perform the extraction. When the extraction determining unit 105 determines not to perform the extraction (Step S1105, No), the second area extracting unit 106 does not perform the extracting process.

When the extraction determining unit 105 determines to perform the extraction (Step S1105, Yes), the second area extracting unit 106 performs area re-extraction by dividing or combining the document areas (Step S1106). The second area extracting unit 106 performs processes at the post-process correcting unit 121, the large-font correcting unit 122, and the reading-order correcting unit 123, in this order.

The extraction determining unit 105 determines whether all the document areas have been subjected to the attribute determination at Step S1104 (Step S1107). When the extraction determining unit 105 determines that there are document areas for which the determination has not been completed (Step S1107, No), the extraction determining unit 105 starts the attribute determination on a document area for which the determination has not been completed (Step S1104).

When the extraction determining unit 105 determines that all the document areas have undergone the determination (Step S1107, Yes), the process is terminated.

With the processing procedure described above, appropriate document areas can be extracted from the document image data, and at the same time, the efficiency can be enhanced in the layout analysis process for the document image data. The processing procedure is described as above to indicate an example of the processing procedure from the process of inputting document image data through the process of extracting document areas from the document image data according to the present embodiment, but the present invention is not limited to this processing procedure.

Figure 14:
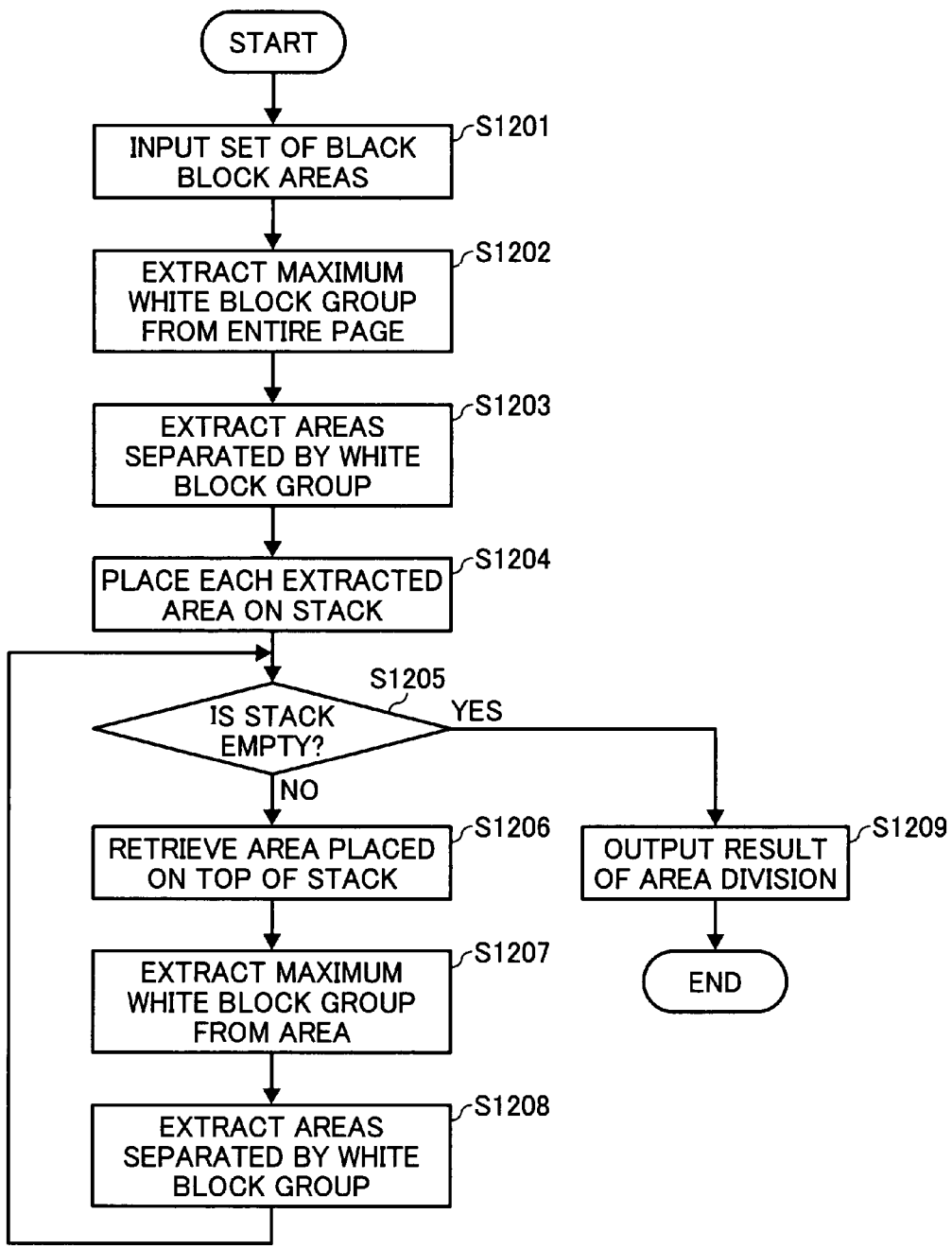
FIG. 14 is a flow chart for explaining the procedure of document image data extracting processes performed by the area extracting unit according to the first embodiment.

Next, the process of extracting the document image data performed by the first area extracting unit 102 according to the present embodiment will be explained. FIG. 14 is a flow chart for explaining the processing procedure performed by the first area extracting unit 102 according to the present embodiment.

First, the white-block extracting unit 111 finds a set of block areas $C=[r0, r1, \ldots, rn]$ ($ri \subset rb$; $i=0, 1, \ldots, n$) and inputs this set C into an algorithm (Step S1201). FIG. 4 is a schematic diagram for explaining an example of a set of block areas.

Next, the white-block extracting unit 111 extracts maximum white-block groups from the entire document image data (Step S1202). In the extraction of the maximum white-block groups, the maximum white-blocks that satisfy $Q(r) \geq t$ are counted in the descending order of the value $Q(r)$, where the evaluation function $Q(r)$ of a white-block r is the area of the white-block r, and the lower limit t is determined in accordance with the size of the document area that is being dealt with. The method described in the above mentioned Non-patent Document 2 may be employed. In addition, the lower limit t may be defined as:

$$t = a \cdot \min(w, h)$$

where w and h denote the width and height, respectively, of the document area in question and a denotes a constant. Further, it is highly likely that white-blocks having shapes that are not appropriate for separators of document areas, such as ones that are too short or too narrow, are spacing between words. To eliminate such white-blocks, restrictions are set. For this purpose, the font size s is estimated based on the distribution of the sizes of black blocks in the document areas, and the maximum white-blocks whose widths and heights are both smaller than $b \cdot s$, where b is a constant, are eliminated when counting up.

Then, the white-block dividing unit 112 divides the entire document image data into several document areas by use of the extracted white-block group as separators; the white-block extracting unit 111 extracts document areas created through division by use of the white-block group (Step S1203); and the extracted document areas are placed on a stack (Step S1204). The stack is a data structure from which the data that is input last is output first. FIG. 6 is a schematic diagram of extracted document areas after dividing a set of block areas illustrated in FIG. 3 by use of the maximum white-block group that is extracted from the entire document image data.

Next, the white-block extracting unit 111 determines whether the stack is empty (Step S1205).

If the stack is not empty (Step S1205, No), the white-block extracting unit 111 retrieves the document area placed on the very top of the stack (Step S1206), and extracts the maximum white-block group within the binary document image corresponding to this document area (Step S1207).

Next, the white-block dividing unit 112 divides this document area into multiple document areas by use of the extracted white-block group as separators. After the white-block extracting unit 111 extracts the document areas created by use of the white-block group (Step S11208), the process proceeds to Step S1205. In other words, the processes at Steps S1206 through S1208 are repeated unless the stack is empty.

On the other hand, when the white-block extracting unit 111 determines that the stack is empty (Step S1205, Yes), the first area extracting unit 102 outputs the result of the area extraction from the document image data (Step S1209), and the process is terminated.

As discussed above, according to the present embodiment, the document area division can be performed in order of "depth preference" hierarchically from a rougher scale to a finer scale, as the lower limit of the evaluation function Q(r) is set to different values. The stack is arranged in a RAM that is incorporated in the image processing device 100.

With the above processing procedure, a document area including different writing orientations can be appropriately divided into and extracted as document areas divided in accordance with writing orientations. The above processing procedure is to show an example of a processing procedure up to the re-extraction with regard to the document area extracted by the first area extracting unit 102 according to the present embodiment, and the present invention should not be limited to this processing procedure.

In the above flow chart, the area extracting process performed by the first area extracting unit 102 has been described. The present invention, however, is not limited thereto. The area extracting process is repeated from Step S1201 on, based on the result of the area extraction at Step S1209 to execute a hierarchical process through recursive division from a rougher level to a finer level.

Up to this point, the extracting process performed by the first area extracting unit 102 has been explained. The process is independent from differences in languages (many languages adopt white background as separators) and does not require knowledge of writing orientations (horizontal-writing/vertical-writing). In addition, because it is a comprehensive process, locally made decision errors are less likely to accumulate. Thus, the document image area extraction can be applied flexibly to complicated layouts.

Next, the processing procedure of further extracting document areas executed by the post-process correcting unit 121 of the second area extracting unit 106 will be explained. In the following process procedure, the situation where the language is determined as "Japanese" and the writing orientation of the document area is determined as "vertical-writing" will be considered. In this situation, the extraction determining unit 105 selects the Japanese vertical-writing correcting unit 701a as a correcting component in accordance with the extraction rule correspondence table.

Figure 15:
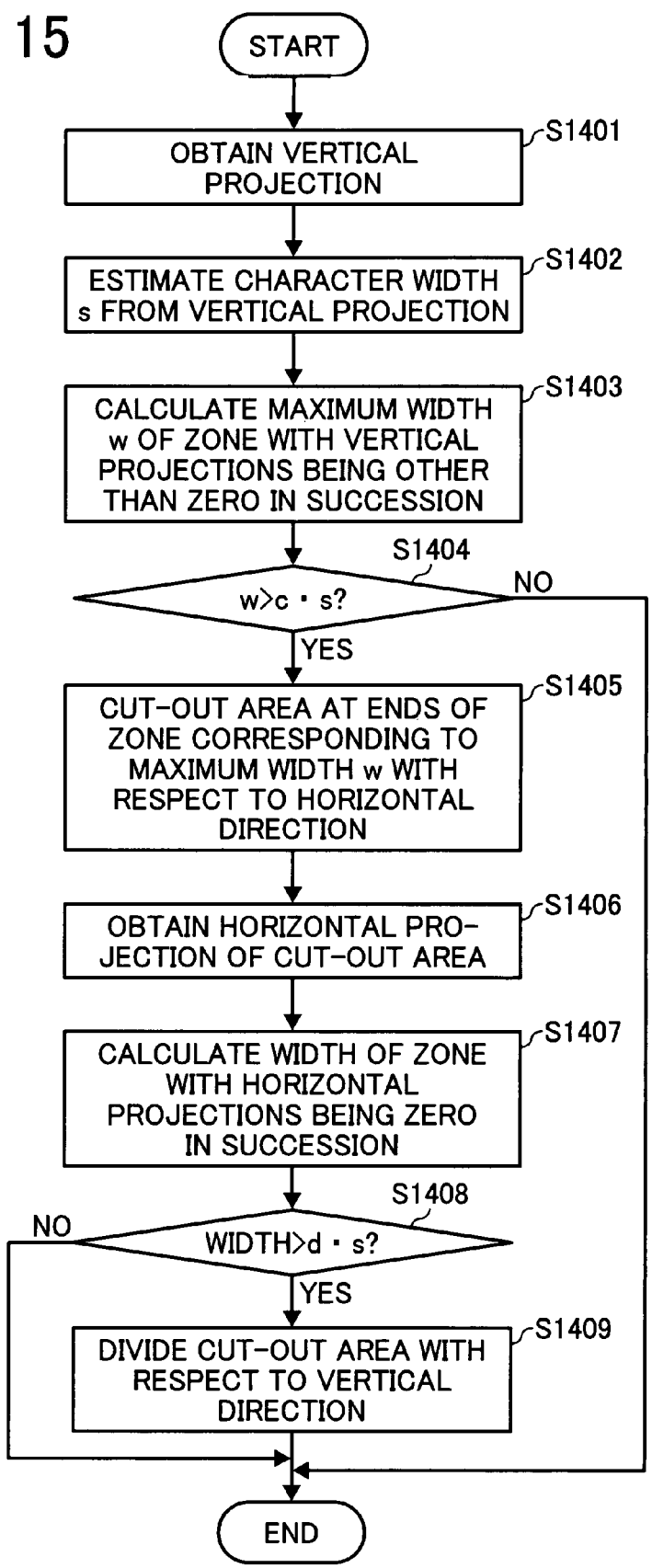
FIG. 15 is a flow chart for explaining the procedure of document area re-extracting processes performed by the Japanese vertical-writing correcting unit according to the first embodiment.

The Japanese vertical-writing correcting unit 701a performs re-extraction on the document area. FIG. 15 is a flow chart for explaining the processing procedure adopted by the Japanese vertical-writing correcting unit 701a according to the present embodiment as described above.

Figure 16A:
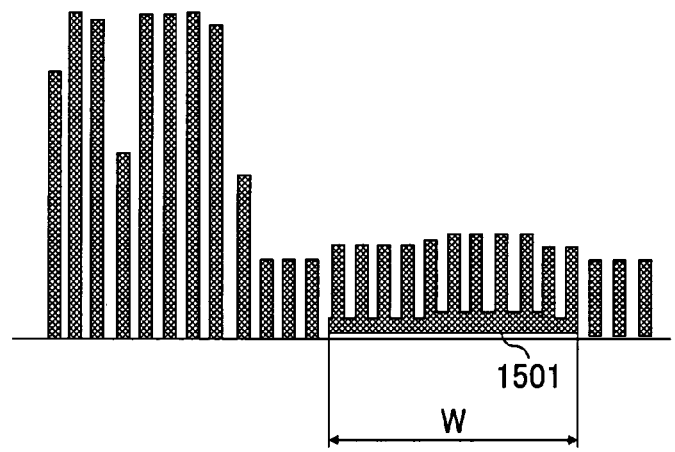
FIG. 16A is a diagram for explaining an example of a vertical projection of a document area taken by the Japanese vertical-writing correcting unit according to the first embodiment.

First, the Japanese vertical-writing correcting unit 701a takes a vertical projection of the document area (Step S1401). FIG. 16A is a diagram for explaining an example of the vertical projection of the document area.

Next, the Japanese vertical-writing correcting unit 701a estimates the font width s on the basis of the statistics (mode, for instance) of the width of a zone in which the projection values are not 0 in a successive manner (Step S1402).

The Japanese vertical-writing correcting unit 701a calculates the maximum width w of a zone in which the projection values are not 0 in a successive manner (Step S1403). In the example illustrated in FIG. 16A, the document area indicated with the reference numeral 1501 has the maximum width w of the zone with successive projection values that are not 0.

Next, the Japanese vertical-writing correcting unit 701a determines whether the calculated value w is greater than c·s (c is a constant, 10, for instant) (Step S1404). When the Japanese vertical-writing correcting unit 701a determines that the calculated value w is smaller than c·s (Step S1404, No), the process is terminated. In other words, the Japanese vertical-writing correcting unit 701a determines that a horizontal-writing document area is included if w is greater than a specific width that is determined with reference to a font width.

Figure 16B:
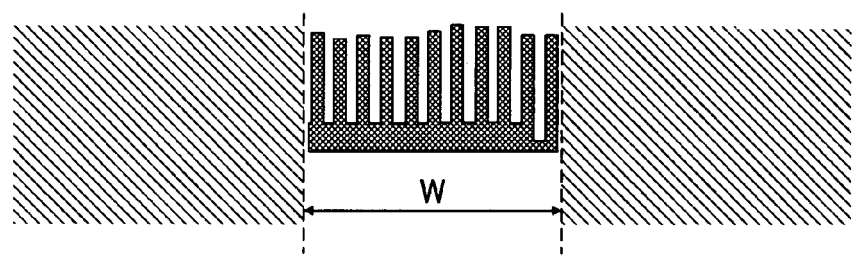
FIG. 16B is a schematic diagram of document area after the division carried out in its horizontal direction by the Japanese vertical-writing correcting unit according to the first embodiment.

Furthermore, when the Japanese vertical-writing correcting unit 701a determines that w is greater than c·s (Step S1404, Yes), it divides the document area at the two ends of the width w in its horizontal direction (Step S1405). FIG. 16B is a schematic diagram of document areas after the Japanese vertical-writing correcting unit 701a divides the area in its horizontal direction.

Thereafter, the Japanese vertical-writing correcting unit 701a takes a horizontal projection of the cut-out document area (Step S1406). Then, the Japanese vertical-writing correcting unit 701a calculates the width of any zone that has successive projection values being 0 (Step S1407).

Next, the Japanese vertical-writing correcting unit 701a determines whether the calculated width is greater than d·s (d is a constant, 0.7, for instance) (Step S1408). When the Japanese vertical-writing correcting unit 701a determines that the width is smaller (Step S1408, No), the process is terminated.

Figure 16C:
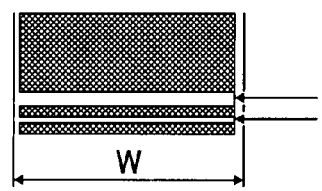
FIG. 16C is a schematic diagram of document areas after the division further carried out in their vertical direction by the Japanese vertical-writing correcting unit according to the first embodiment.

When the Japanese vertical-writing correcting unit 701a determines that the width is greater (Step S1408, Yes), the document area is further divided in its vertical direction at the width portion (Step S1409). FIG. 16C is a schematic diagram of the document areas after the Japanese vertical-writing correcting unit 701a further divides the document area in its vertical division.

The above processing procedure enables a document area having different writing orientations to be extracted as document areas each having an appropriate writing orientation. The above processing procedure is given as an example of a processing procedure up to the re-extraction of a document area that has been extracted by the first area extracting unit 102 according to the present embodiment, but the present invention is not limited to this processing procedure.

Next, the processing procedure for combining document areas according to font sizes at the large-font correcting unit 122 of the second area extracting unit 106 and thereby extracting areas will be explained. In the following processing procedure, it is assumed that the language is determined as "Japanese", the writing orientation of the document area is not determined, and the font size of the document area is determined as "large". Under such conditions, the extraction determining unit 105 selects the Japanese large-font correcting unit 702a as a correcting component with reference to the extraction rule correspondence table.

Figure 17:
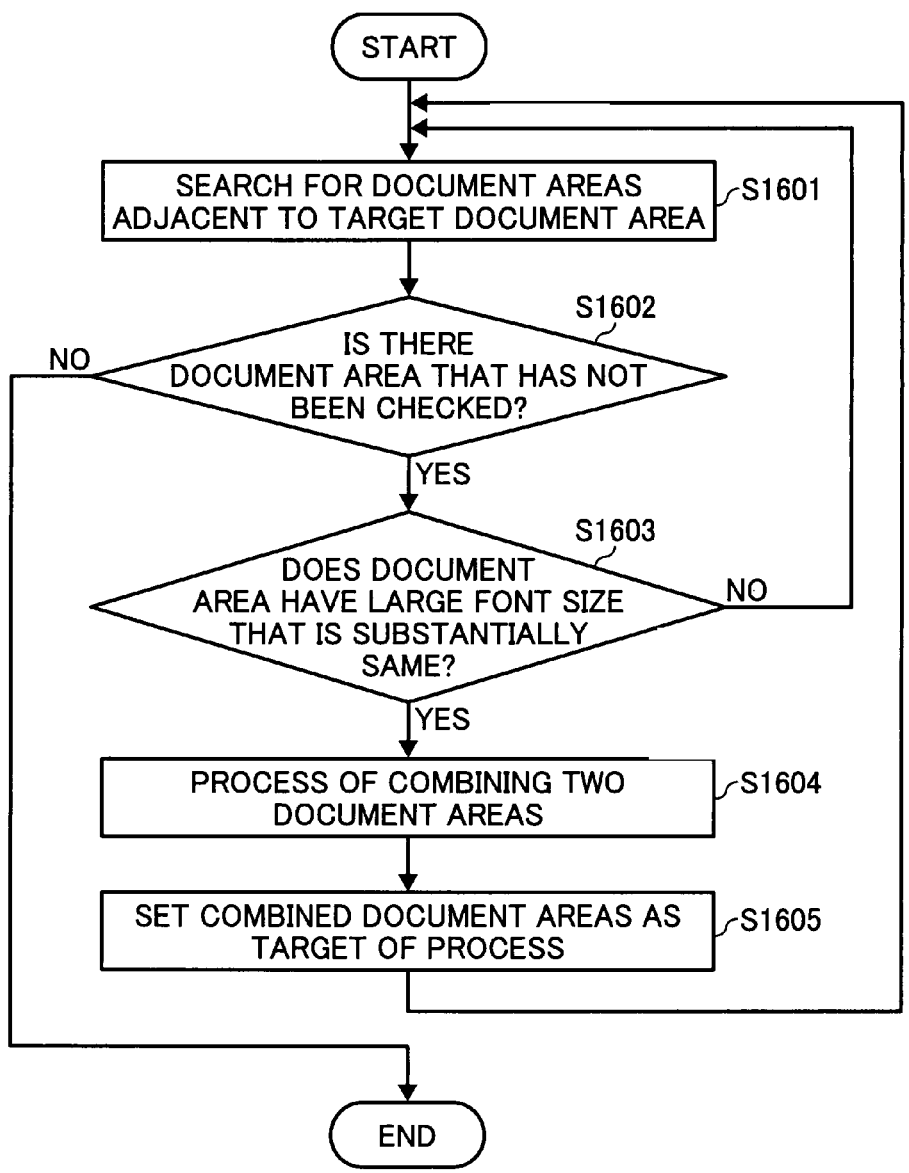
FIG. 17 is a flow chart for explaining the procedure of processes for combining large-font document areas performed by the Japanese large-font correcting unit according to the first embodiment.

The Japanese large-font correcting unit 702a performs a process of combining document areas having a large font. FIG. 17 is a flow chart for explaining the processing procedure of the Japanese large-font correcting unit 702a according to the present embodiment.

First, the Japanese large-font correcting unit 702a searches for a document area adjacent to the document area of interest (Step S1601).

Then, the Japanese large-font correcting unit 702a determines whether an unchecked document area has been found through the search (Step S1602).

If an unchecked document area has been found (Step S1602, Yes), the Japanese large-font correcting unit 702a determines whether the characters included in the found document area are in a large font and whether they are approximately of the same size as the characters included in the document area of interest (Step S1603). When the Japanese large-font correcting unit 702a determines that the characters of the two document areas are not of the same size (Step S1603, No), the search of a document area adjacent to the document area of interest starts again (Step S1601).

When the Japanese large-font correcting unit 702a determines that the characters of the two document areas are of the same size (Step S1603, Yes), it carries out a process of combining these two document areas (Step S1604).

When the Japanese large-font correcting unit 702a cannot find any unchecked document area through the search (Step S1602, No), the process is terminated.

The above processing procedure allows document areas generated character-by-character owing to their large font size to be combined and extracted as an appropriate document area. The above processing procedure is given as an example of a processing procedure followed by the Japanese large-font correcting unit 702a according to the present embodiment for combining document areas of a large font size. The present invention is not limited to this processing procedure, however.

In the present embodiment, an example of a case where a post-process correction, a large-font correction, and a reading order correction are performed as language-dependent processes at the second area extracting unit 106 has been explained, but it is not limited to these processes. A different process may be performed as a language-dependent process.

According to the present embodiment, the structural components of the second area extracting unit 106 which are provided with rules corresponding to individual languages divide and combine document areas to extract them after the division and extraction of document areas by use of the "maximum white-block group page segmentation". Hence, the efficiency of the layout analysis process is enhanced, and moreover, the accuracy is increased through area division that corresponds to a distinctive layout for a language.

Figure 18:
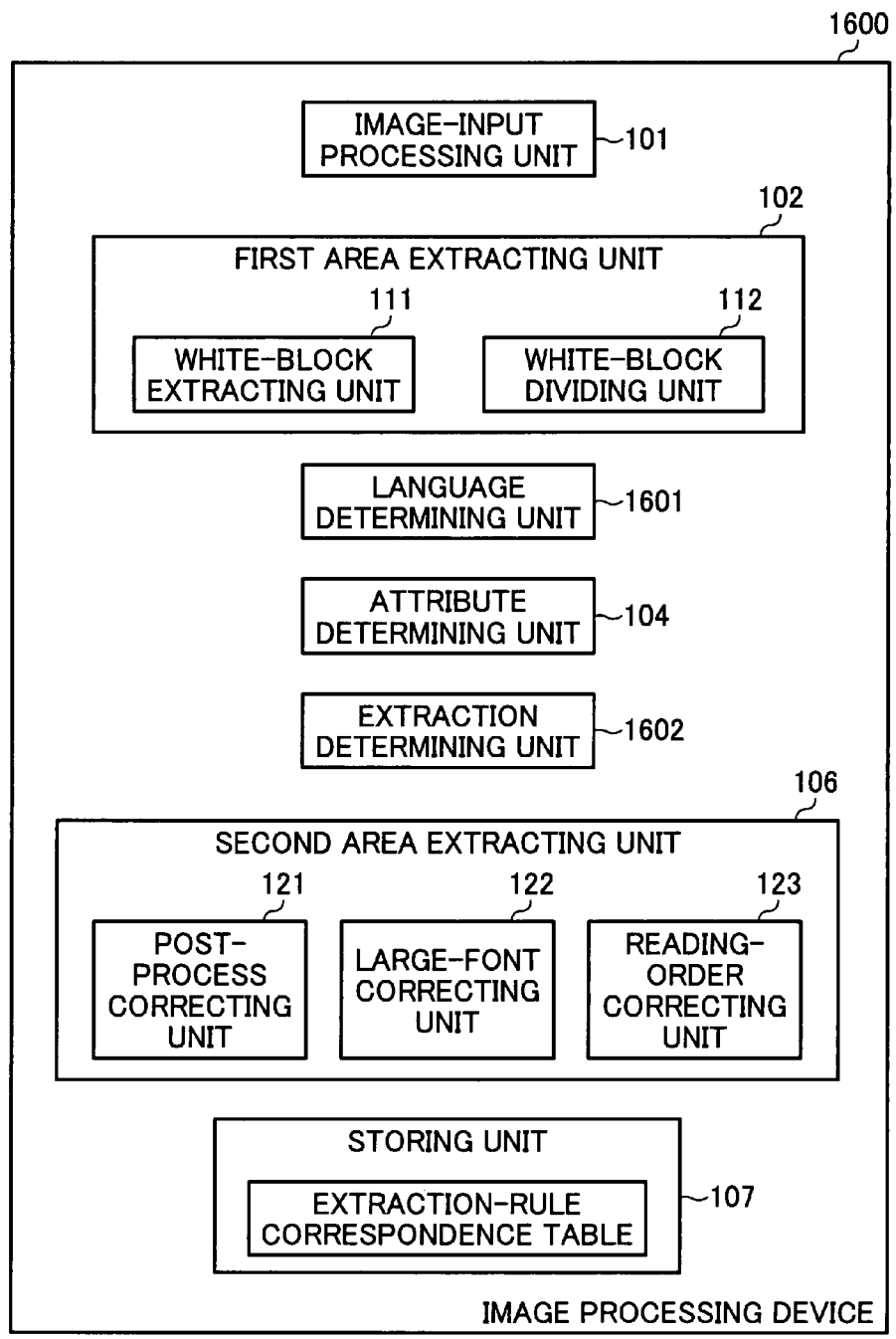
FIG. 18 is a block diagram of a structure of an image processing device according to a second embodiment.

FIG. 18 is a block diagram of a structure of an image processing device 1600 according to a second embodiment. The image processing device 1600 differs from the image processing device 100 according to the first embodiment in that the language determining unit 103 is replaced with a language determining unit 1601 executing a different process and that the extraction determining unit 105 is replaced with an extraction determining unit 1602 executing a different process. The following explanation omits the description of structural elements that are identical to those of the first embodiment, by assigning the same numerals. In contrast to the image processing device 100 according to the first embodiment, which determines the language based on the entire document image data, the image processing device 1600 according to the present embodiment carries out language determination for every document area.

The language determining unit 1601 determines languages for individual document areas that are extracted by the first area extracting unit 102. Other processes of the language determining unit 1601 are the same as the language determining unit 103, and thus the description thereof is omitted.

The extraction determining unit 1602 determines whether to perform further extraction of each document area on the basis of the language of each document area determined by the language determining unit 103 and the attributes of each document area determined by the attribute determining unit 104. The extraction determining unit 1602 differs from the extraction determining unit 105 according to the first embodiment only in that the determination is based on the language of the entire document image data or the language of each extracted document area, and thus the description thereof is omitted.

Figure 19:
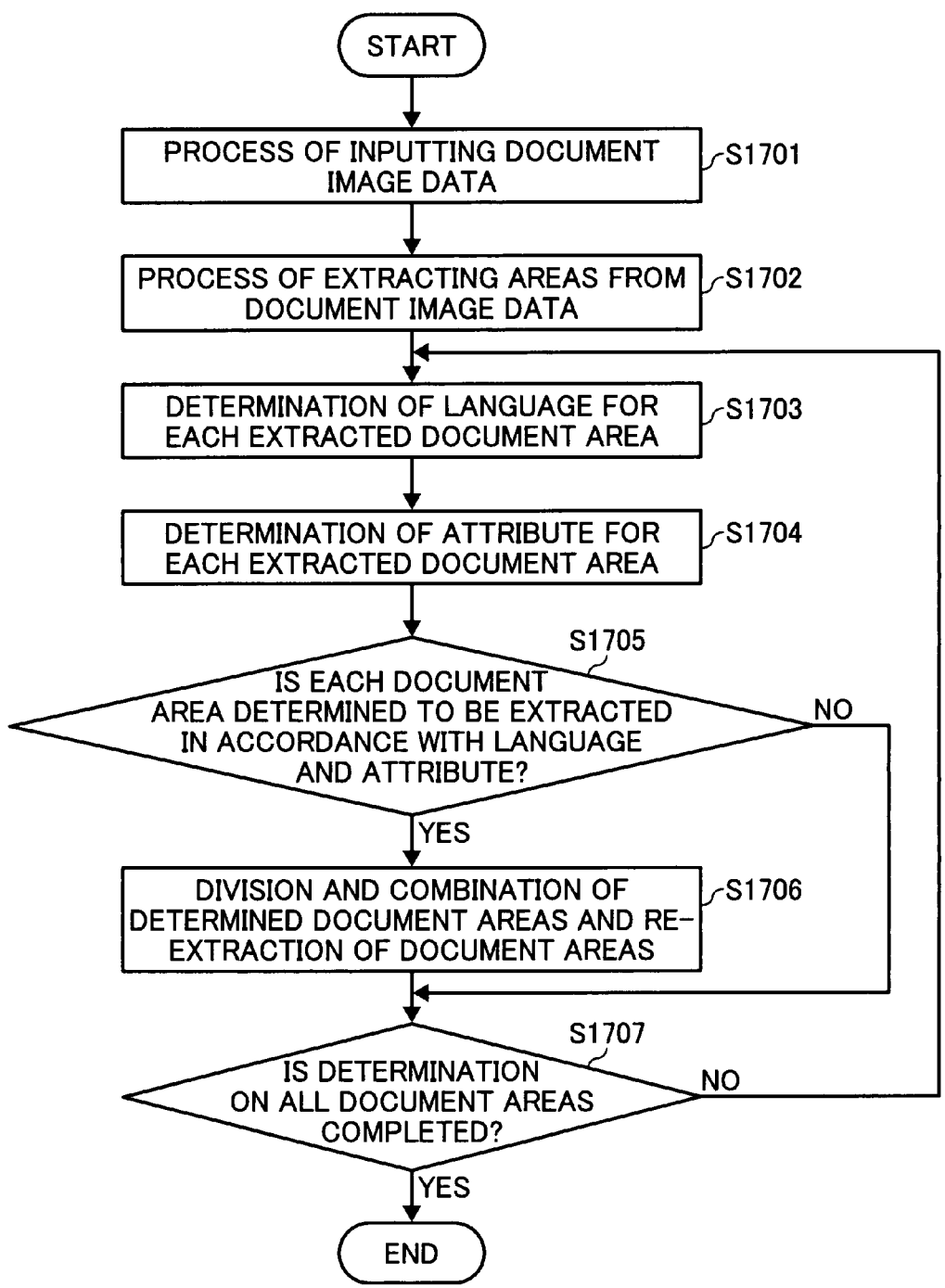
FIG. 19 is a flow chart for explaining the procedure of a process of inputting document image data through a process of extracting document areas from the document image data performed by the image processing device according to the second embodiment.

Next, the procedure followed by the image processing device 1600 configured as described above according to the present embodiment, of the process of inputting document image data through the process of extracting the document area from the document image data will be explained. FIG. 19 is a flow chart for explaining the processing procedure of the image processing device 1600 according to the present embodiment.

First, the area extracting process is executed on the document image data in a similar manner to Steps S1101 and S1102 indicated in FIG. 13 according to the first embodiment (Steps S1701 and S1702).

Next, the language determining unit 1601 determines the language for each of the extracted document areas (Step S1703). Thereafter, the attribute determining unit 104 determines the attribute (writing orientation or font size) of each of the extracted document areas (Step S1704).

The extraction determining unit 1602 determines whether to extract a document area on the basis of the language determined by the language determining unit 1601 and the attribute of the document area determined by the attribute determining unit 104 (Step S1705). The extraction determining unit 105 uses the extraction rule correspondence table stored in the storing unit 107 when making a determination on extraction.

Next, the second area extracting unit 106 performs extraction on the document area that has been determined by the extraction determining unit 1602 to be extracted (Step S1706).

The extraction determining unit 1602 determines whether the language determination at Step S1703 is completed for all the document areas (Step S1707). When the extraction determining unit 1602 determines that the determination on all the document areas is not completed (Step S1707, No), the extraction determining unit 1602 starts the language determination on undetermined document areas (Step S1703).

When the extraction determining unit 1602 determines that the determination on all the document areas is completed (Step S1707, Yes), the process is terminated.

The above processing procedure enables the document image data to be extracted as appropriate document areas even when different languages are used in different document areas, and in addition, it enhances the efficiency of the layout analysis process carried out onto the document image data. The above processing procedure has been described as an example of the processing procedure according to the present embodiment from the process of inputting the document image data through the process of extracting the document area, but the present invention is not limited thereto.

As described above, the image processing device 1600 according to the present embodiment determines the language of every extracted document area and then determines whether to execute a process. Thus, in addition to the advantages obtained in the first embodiment, it offers an advantage of suitably extracting document areas even when different languages are used for different document areas.

Neither of the image processing devices according to the aforementioned embodiments executes any process after the extracting process of the second area extracting unit 106. The present invention, however, is not limited to the extracting processes performed by the first area extracting unit 102 and the second area extracting unit 106. With an image processing device 1800 according to a third embodiment, a structure provided with a further extracting unit will be focused on.

Figure 20:
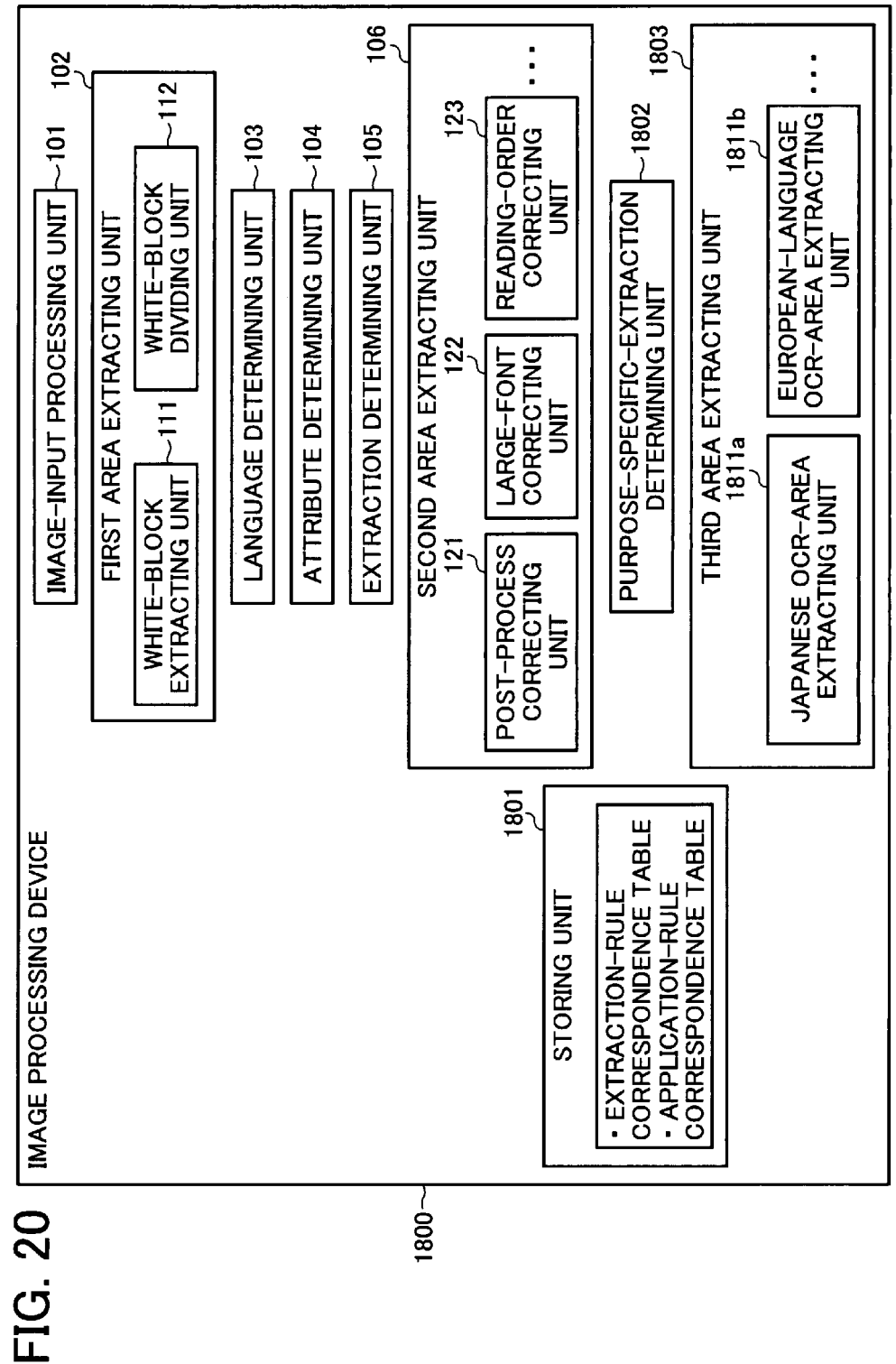
FIG. 20 is a block diagram of the structure of an image processing device according to a third embodiment.

FIG. 20 is a block diagram of the structure of the image processing device 1800 according to the third embodiment. The image processing device 1800 differs from the image processing device 100 according to the first embodiment in that a storing unit 1801 stores information different from the information stored in the storing unit 107 and that a purpose-specific extraction determining unit 1802 and a third area extracting unit 1803 are added. In the following explanation, structural components that are identical to the ones of the first embodiment are provided with the same numerals, and the description thereof is omitted.

The storing unit 1801 includes a database. The storing unit 1801 also stores an extraction rule correspondence table and an application rule correspondence table in this database. The storing unit 1801 is a storing means and can be configured with any storing means that area generally used, such as an HDD, an optical disk, and a memory card. The explanation of the extraction rule correspondence table, which is the same as the extraction rule correspondence table stored in the storing unit 107 according to the first embodiment, is omitted here.

Figures 21, 22:
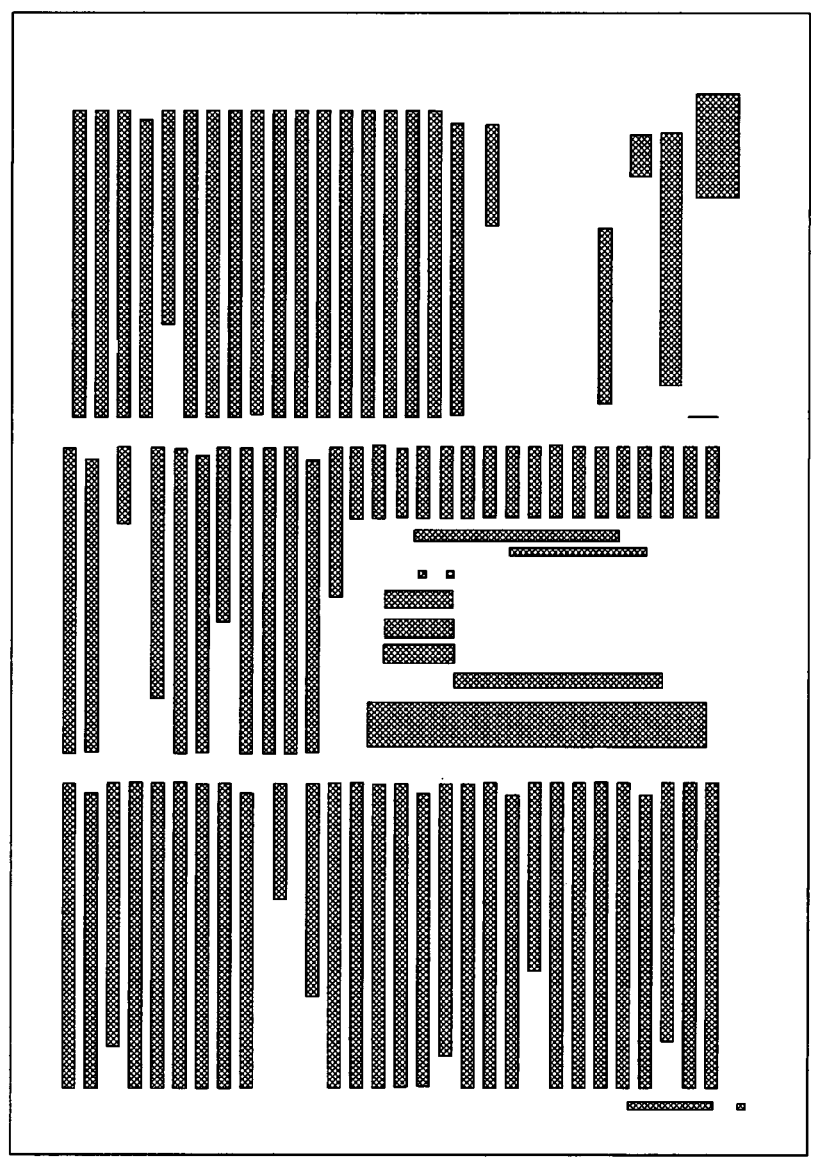
FIG. 21 is a diagram of a structure of an application rule correspondence table stored in the storing unit of the image processing device according to the third embodiment.
FIG. 22 is a diagram for explaining an example of a result of an extracting process performed on each document area by the Japanese OCR-area extracting unit according to the third embodiment.

FIG. 21 is a diagram of a structure of the application rule correspondence table. As shown in this drawing, the application rule correspondence table defines and stores correspondences between purpose applications, which are the purposes of using the image data, and the application-specific area extracting units. The application-specific area extracting units here refer to structural components that are included in the third area extracting unit 1803 described later to divide and combine areas in compliance with the rules defined for individual applications of the document image data and extract the areas. In other words, the application rule correspondence table stores processes feasible at the third area extracting unit 1803 in correspondence with the purpose applications. The use of this application rule correspondence table will be explained in detail later.

The purpose-specific extraction determining unit 1802 determines whether the area extraction should be performed at the third area extracting unit 1803, which will be discussed later, in accordance with the purposes of using the document image data extracted as individual document areas, or more specifically, in accordance with the applications and tasks thereof. The purpose-specific extraction determining unit 1802 according to the present embodiment determines whether to extract by conducting a search through the application rule correspondence table stored in the storing unit 1801 with the intended application or task as a key to find a corresponding record. The purpose-specific extraction determining unit 1802 determines to execute an extracting process when there is a corresponding record. The number of corresponding records found by the purpose-specific extraction determining unit 1802 through the search is not limited to one but may be more than one. If this is the case, the third area extracting unit 1803 performs multiple processes.

In an example of a determination made by the purpose-specific extraction determining unit 1802, if the application is a Japanese OCR, the application-specific extracting unit searches for a record of the "Japanese OCR area extracting unit" from the application rule correspondence table. In response, a Japanese OCR-area extracting unit 1811*a* of the third area extracting unit 1803, which will be described later, performs an extracting process onto the document area. In the determination of the document area extraction, the extracting process is performed by the third area extracting unit 1803 when a record is found from the application rule correspondence table, and is not performed otherwise. The present embodiment is not limited to the determination of the extracting process by use of such an extraction rule correspondence table, and any criteria may be configured for judgment of the extraction. In addition, the application setting may be established in any manner. For instance, the applications may be input by a user when the document image data is input.

Furthermore, processes such as tasks may be incorporated as purposes, other than applications, in the present embodiment.

Next, different area extraction results obtained depending on applications and tasks will be explained. In the application such as an OCR, for example, "line-by-line" division resulting in areas smaller than the extraction outcome illustrated in FIG. 10 is required. In another example, the "column-by-column" division as illustrated in FIG. 10 is required for a task in which an operator edits the document image data. This is because a large burden is created in an editing task if the "line-by-line" division favorable for an OCR is conducted, the operator having to edit line by line.

The "line-by-line" division differs from language to language. For instance, unlike Japanese, European languages such as English include a space between any two words, and characters of different sizes that are positioned with reference to a base line, slightly above or below the line. Thus, according to the present embodiment, the third area extracting unit 1803 is provided with structural components in correspondence with different languages and also with different applications and tasks. This enables document areas to be extracted in accordance with individual languages and with individual applications and tasks.

The third area extracting unit 1803 includes structural components for conducting extracting processes suitable for individual applications, such as the Japanese OCR-area extracting unit 1811*a* and a European-language OCR-area extracting unit 1811*b*.

One of the structural components for conducting extracting processes suitable for individual applications, such as the Japanese OCR-area extracting unit 1811*a* and the European-language OCR-area extracting unit 1811*b*, conducts an extracting process for each document area when it is selected by the purpose-specific extraction determining unit 1802.

For instance, when a process is to be performed with a Japanese OCR, the text needs to be divided into lines. When the Japanese OCR-area extracting unit 1811*a* is selected, the Japanese OCR-area extracting unit 1811*a* divides the document area into lines, and the divided document areas are extracted. Any process may be adopted for line-by-line division. In the line dividing process carried out by the Japanese OCR-area extracting unit 1811*a* according to the present embodiment, a known technology disclosed in Japanese Patent Application Laid-open No. 2004-102796 is adopted.

FIG. 22 is a diagram for explaining an example of a result of the extracting process performed on each document area by the Japanese OCR-area extracting unit 1811*a*. The state of the document image data before the extracting process performed by the Japanese OCR-area extracting unit 1811*a* is similar to the example illustrated in FIG. 10 according to the first embodiment. As illustrated in FIG. 22, the Japanese OCR-area extracting unit 1811*a* divides the document areas into smaller areas, each composed of a single line, to make them more suitable for a Japanese OCR to read.

Other structural components such as the European-language OCR-area extracting unit 1811*b* individually perform a document area extracting process that is suitable for a specific application. Any known technology may be adopted for the processes conducted by these components.

Next, an explanation will be given to the procedure from the process of inputting document image data through the process of extracting document areas from the document image data executed by the image processing device 1800 configured as above according to the present embodiment. FIGS. 23A-23B is a flow chart for explaining the processing procedure of the image processing device 1800 according to the present embodiment.

First, the document image data is extracted as document areas in a similar manner to Steps S1101 through S1107 indicated in FIG. 13 according to the first embodiment (Steps S2201 through S2207).

Then, the purpose-specific extraction determining unit 1802 determines whether to conduct a further document area extraction, on the basis of the intended application or task of the document image data from which the document areas have been extracted (Step S2208). When the purpose-specific extraction determining unit 1802 determines not to conduct document area extraction (Step S2208, No), the process is terminated without the third area extracting unit 1803 executing any process.

When the purpose-specific extraction determining unit 1802 determines to extract document areas (Step S2208, Yes), a component included in the third area extracting unit 1803 performs area extraction on each document area (Step S2209). The component that performs the document area extraction is selected in advance by the purpose-specific extraction determining unit 1802. The entire process is terminated when the extracting process is completed on all the document areas.

The above processing procedure enables the document image data to be extracted as appropriate document areas, and increases the efficiency of the layout analysis process performed on the document image data. The above processing procedure from the process of inputting document image data through the process of extracting document areas from the document image data has been given as an example of the present embodiment, and the present invention is not limited to this processing procedure.

In addition to the advantages obtained in the first embodiment, the image processing device 1800 according to the present embodiment offers an advantage of incorporating a specific area extracting method into an intended application or task for using the image data, by selecting one or more components that correspond to the application or task to perform an extracting process. In other words, document areas can be extracted suitably in accordance with purposes. This can further increase the efficiency and accuracy of the layout analysis process.

Figure 24:
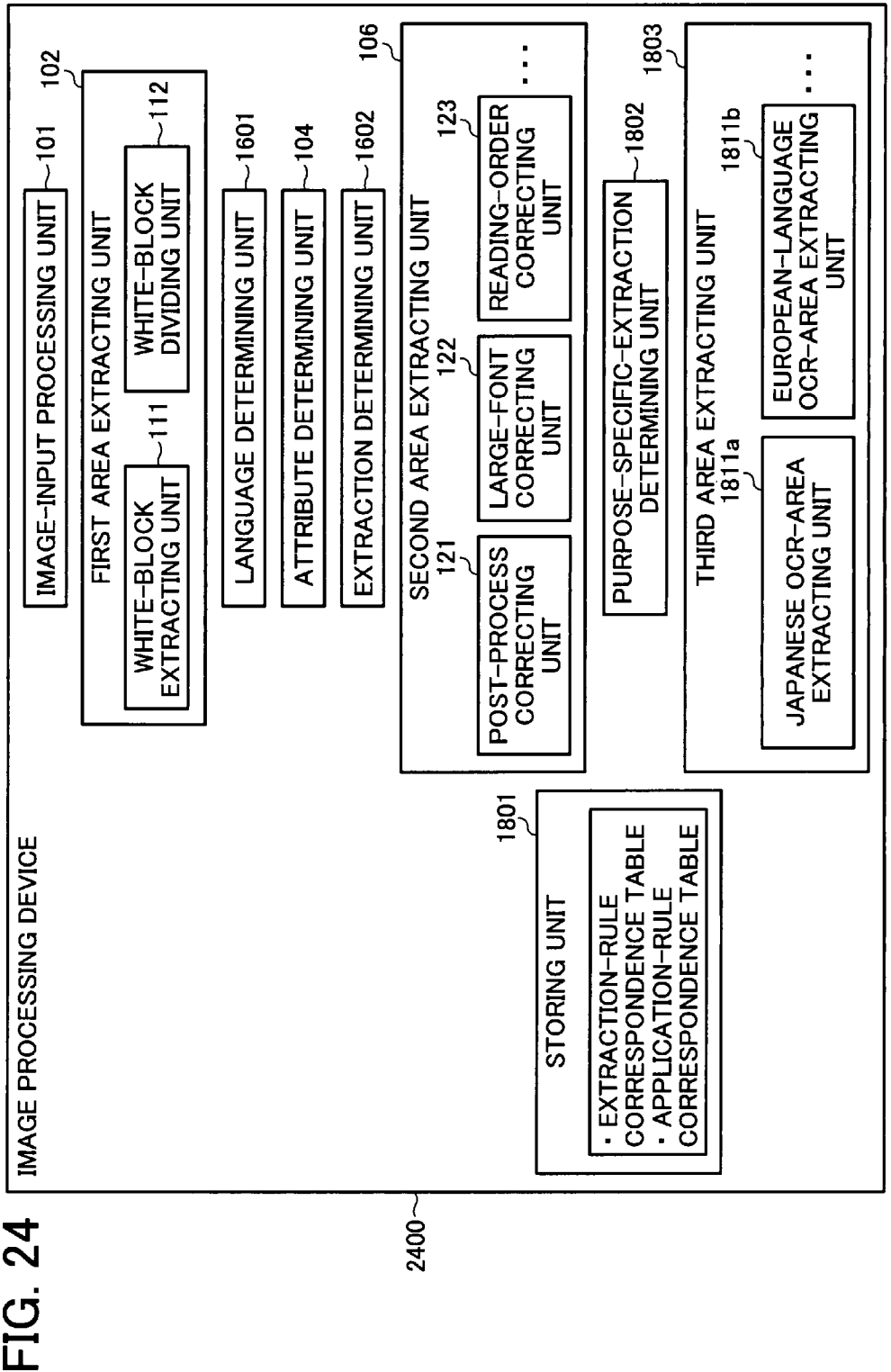
FIG. 24 is a block diagram of a structure of an image processing device according to a fourth embodiment.

FIG. 24 is a block diagram of a structure of an image processing device 2400 according to the fourth embodiment. The image processing device 2400 is different from the image processing device 1800 according to the third embodiment in that the language determining unit 103 is replaced with the language determining unit 1601 that executes a different process and that the extraction determining unit 105 is replaced with the extraction determining unit 1602 that executes a different process. In the following description, structural components that are identical to those of the third embodiment are provided with the same numerals, and the explanation of these elements is omitted. The language determining unit 1601 and the extraction determining unit 1602 are the same as the structural components of the image processing device 1600 according to the second embodiment, and the explanation of these elements is omitted.

The image processing device 2400 according to the present embodiment follows the procedure of the image processing device 1600 up to the process of determining the language for each document area and causing the second area extracting unit 106 to extract the area, and then the image processing device 2400 executes an extracting process appropriate for an application or a task in a similar manner to the image processing device 1800 according to the third embodiment.

Figure 25A:
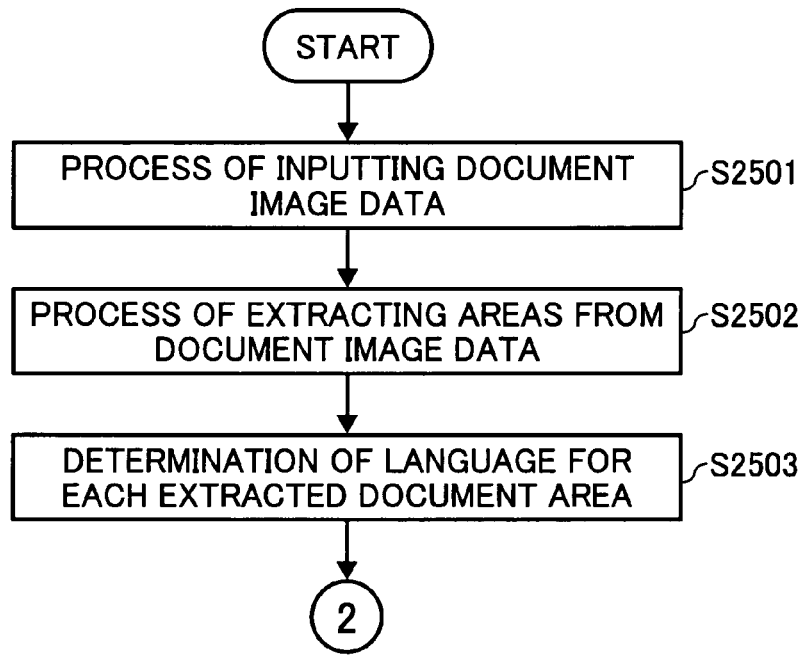
FIGS. 25A-25B is a flow chart for explaining the procedure of a process of inputting document image data through a process of extracting document areas from the document image data performed by the image processing device according to the fourth embodiment.
Figure 25B:
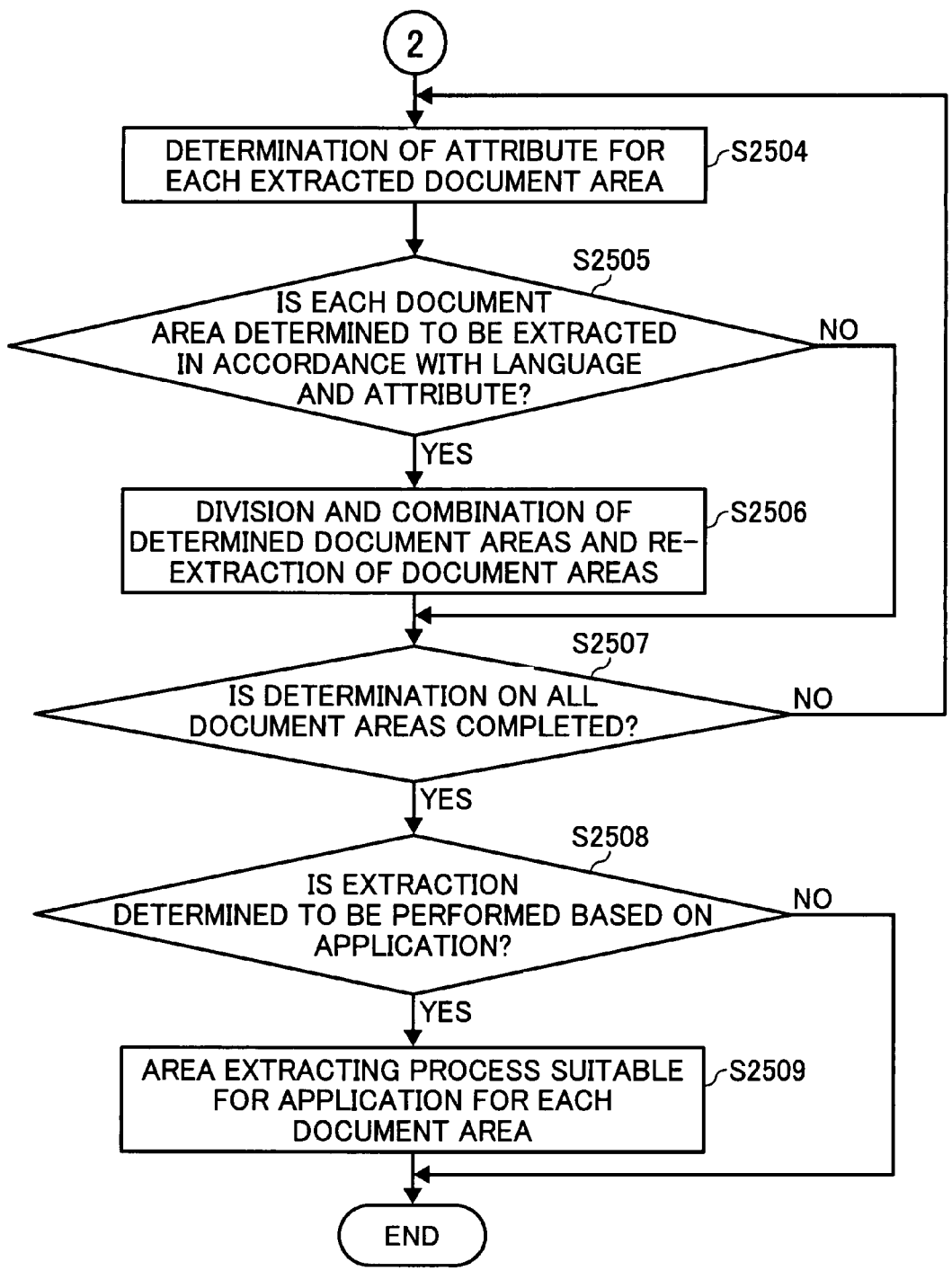

Next, an explanation will be given to the procedure of the process of inputting document image data through the process of extracting document areas from the document image data performed by the image processing device 2400 configured as the above, according to the present embodiment. FIGS. 25A-25B is a flow chart for explaining the above processing procedure followed by the image processing device 2400 according to the present embodiment.

First, the document image data is extracted as document areas in a similar manner to Steps S1701 through S1708 indicated in FIG. 19 according to the second embodiment (Steps S2501 through S2507).

Thereafter, an extracting process suitable for a certain application or task is performed in a similar manner to Steps S2205 through S2209 indicated in FIGS. 23A-23B according to the third embodiment (Steps S2508 through S2509).

The above processing procedure enables the document image data to be extracted as appropriate document areas and increases the efficiency of the layout analysis process performed on the document image data. The above processing procedure is given as an example of a processing procedure according to the present embodiment, from the process of inputting the document image data to the process of extracting document areas from the document image data, and the present invention is not limited to this processing procedure.

Furthermore, the image processing device 2400 according to the present embodiment determines the language for each of the extracted document areas, based on which whether to perform a process is determined in a similar manner to the second embodiment. Hence, in addition to the advantages discussed in the third embodiment, the present embodiment offers an advantage of suitably extracting document areas even when different languages are used in different document areas.

Figure 26:
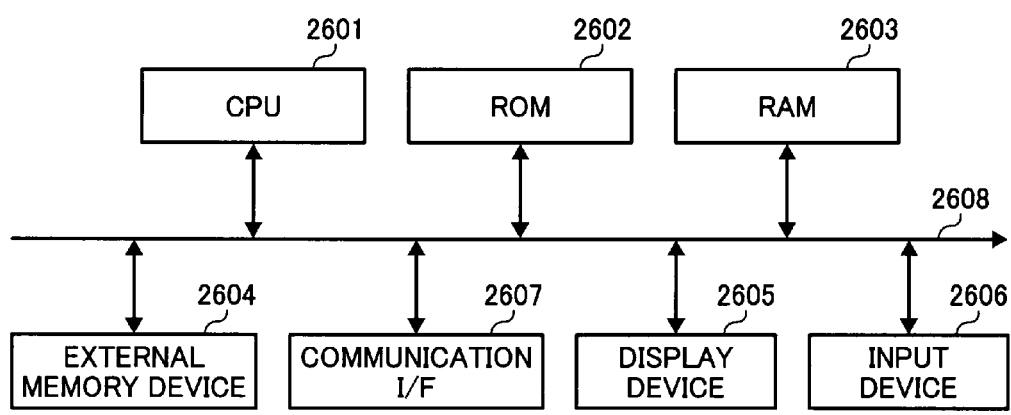
FIG. 26 is a diagram of a hardware structure of a PC that executes programs realizing the functions of the image processing device.

FIG. 26 is a diagram of a hardware structure of a personal computer (PC) that executes a program executing the functions of the image processing device according to the above embodiment. The image processing device according to the above embodiment includes a controlling device such as a central processing unit (CPU) 2601, memory devices such as a read only memory (ROM) 2602 and a random access memory (RAM) 2603, an external memory device 2604 such as a hard disk drive (HDD) and a compact disk (CD) drive device, a display device 2605 such as a display, an input device 2606 such as a keyboard and a mouse, a communication interface (I/F) 2607, and a bus 2608 for connecting these devices. The image processing device has a hardware structure using an ordinary computer.

In the above embodiment, an ordinary personal computer adopted as an image processing device has been explained, but the invention is not limited thereto. A mobile information terminal called a personal digital assistant (PDA), a palm top PC, a cellular phone, or the Personal Handyphone System (PHS) may be adopted in place.

The components of the above image processing device are realized with software programs. When prime importance is placed, however, on real-time processing, speedups are required. Then, it is favorable that a logic circuit (not shown) is added to the structure to execute computing processes.

The image processing programs executed by the image processing device according to the above embodiment are recorded on a computer-readable recording medium such as a CD-ROM, a flexible disk (FD), a CD-R, and a digital versatile disk (DVD), as files in installable format or executable format.

Moreover, the image processing programs executed by the image processing device according to the above embodiment may be stored in a computer connected to a network such as the internet so that the programs can be downloaded through the network. The image processing programs executed by the image processing device according to the above embodiment may also be offered or distributed via a network such as the internet.

The image processing programs according to the present embodiment may be stored in advance in a ROM or the like.

The image processing programs executed by the image processing device according to the present embodiment are configured as a module including the above described components (the image-input processing unit, the first area extracting unit, the language determining unit, the attribute determining unit, the extraction determining unit, the second area extracting unit, and if necessary, the purpose-specific area determining unit and the third area extracting unit). As an actual hardware device, the CPU reads an image processing program from the recoding medium and executes it so that the above components are loaded onto the main memory device. The image-input processing unit, the first area extracting unit, the language determining unit, the attribute determining unit, the extraction determining unit, the second area extracting unit, and if necessary, the purpose specific extraction determining unit, and the third area extraction unit are thereby generated on the main memory device.

Figure 27:
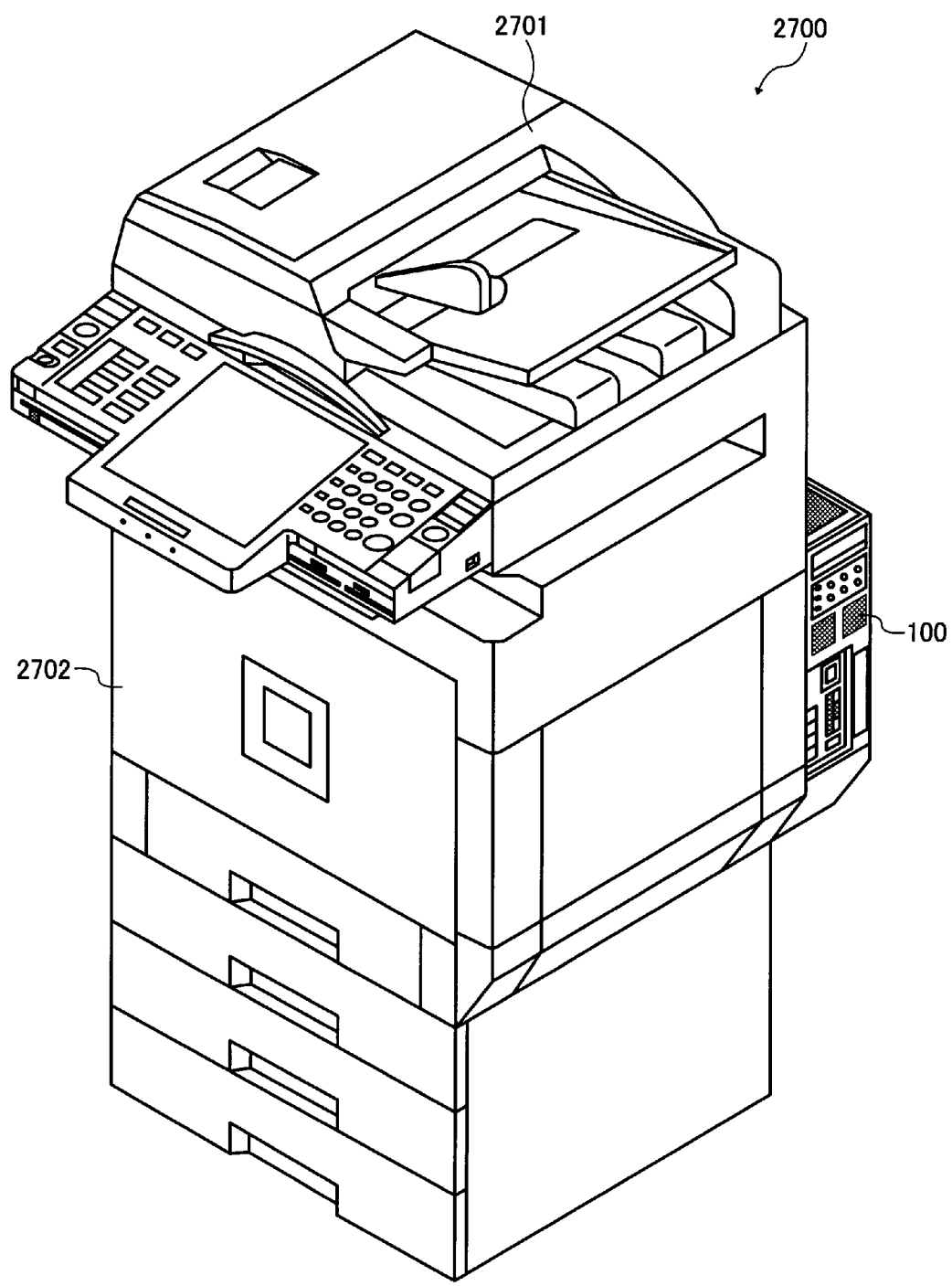
FIG. 27 is a perspective view of the outline of a digital multifunctional device.

Furthermore, the above embodiment adopts a computer such as a PC as an image processing device, but the present invention is not limited thereto. The image processing device 100 may be an information processing device incorporated in a digital multifunction product (MFP) 2700, as illustrated in FIG. 27, which serves as an image forming device including a scanning unit 2701 as an image reading unit and a printing unit 2702 as an image printing device, where a scanned image read by the scanning unit 2701 of the digital MFP 2700 is subjected to a layout analysis process. The image processing device is not limited to the image processing device 100, and an image processing device described in another embodiment may be adopted.

Figure 28:
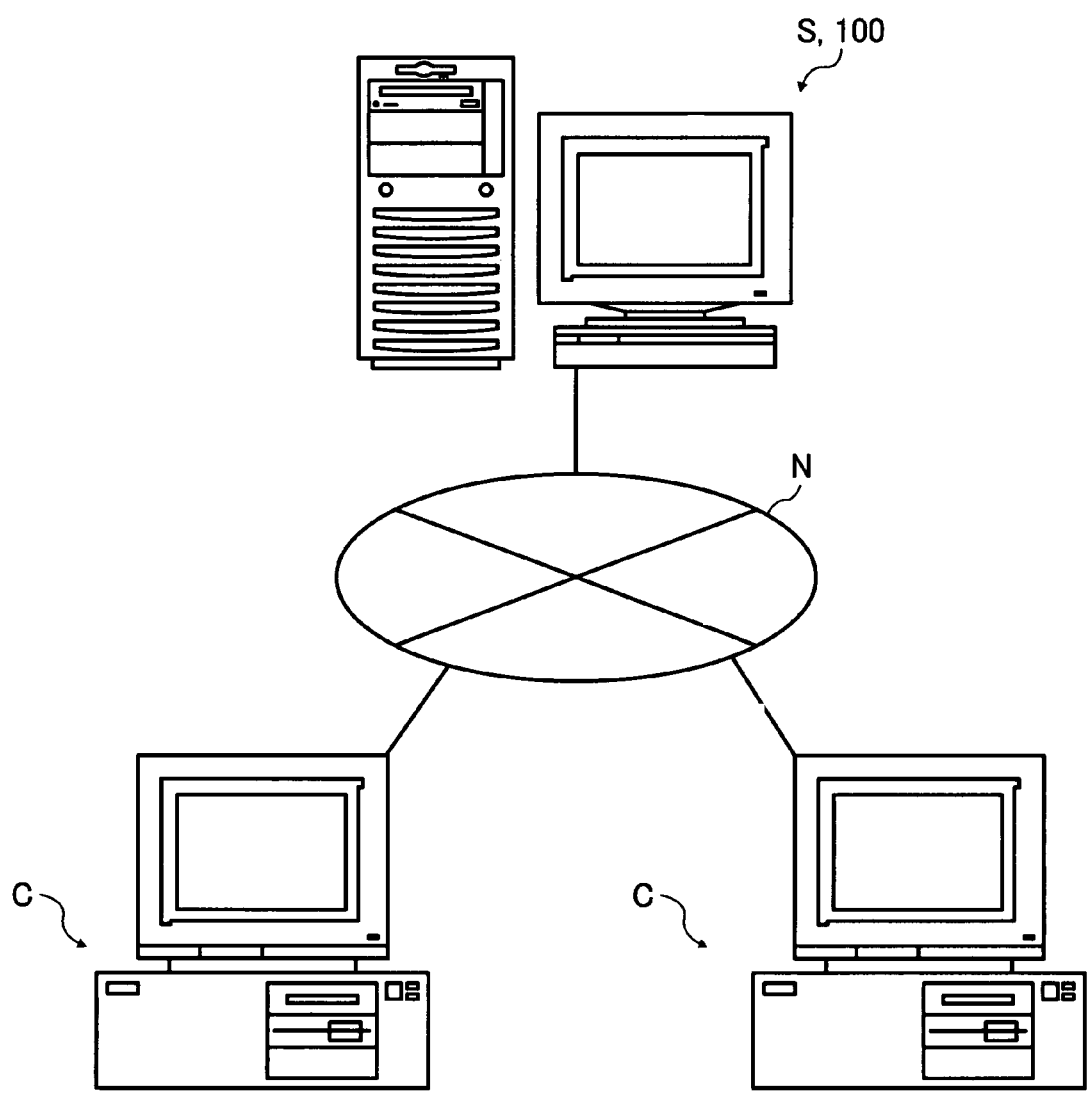
FIG. 28 is a schematic view of a server-client system.

In addition, a local system (a single PC, for instance) is adopted for the image processing device according to the above embodiment, but the present invention is not limited thereto. For example, as illustrated in FIG. 28, it may be applied to a server-client system in which client computers C are connected to a server computer S through a network N. If this is the case, an image is transmitted from each of the client computers C to the server computer S (the image processing device 100), where the image is subjected to a layout analysis process. The image processing device that is incorporated is not limited to the image processing device 100, but the image processing device described in another embodiment or the like may be used.

According to the present invention, after extracting document areas in compliance with rules that are independent of differences in languages, the document areas are divided or combined in compliance with rules that correspond to each language and extracted. This advantageously enhances the efficiency of the layout analysis processing and, at the same time, realizes high accuracy in dividing into areas in a manner that corresponds to a layout specific to a language.

The preset invention also offers an advantage that, with the extracting process corresponding to a specific language designed to be performed only when it is necessary, a burden in the extracting process is reduced.

The present invention has another advantage of extracting document areas with higher accuracy because document areas are divided and combined for extraction in compliance with rules that correspond to the attributes of the document areas in addition to rules that correspond to a specific language.

In addition, the present invention has an advantage of reducing the load on the extracting process by performing the extraction process in accordance with languages and attributes only when necessary.

The present invention determines which language is to be dealt with from the entire document image data, which means that the language determination is based on wide range of information. Hence, the language determination is made with high accuracy.

In addition, the present invention determines which language is to be dealt with for each document area. Thus, by performing suitable extraction for each document area, document areas can be extracted with high accuracy even when characters of different languages are used in different document areas.

Further, the present invention enables the document areas to be extracted in compliance with rules that correspond to intended use of the document image data. Thus, there is an advantage that document areas suitable for the use can be extracted.

Still further, the present invention allows the extracting process to be performed in accordance with the intended use of the document image data only when it is necessary. Thus, there is an advantage that the load on the extracting process can be reduced.

The present invention makes a determination on at least one of writing orientation and font size, offering an advantage of suitably extracting document areas on the basis of such attributes.

In addition, according to the present invention, by recursively executing extraction of the maximum white-block groups and division of document areas, hierarchical processing is performed, as a process of extracting document areas, through recursive divisions from a rougher level to a finer level. Thus, an advantage of increased efficiency in layout analysis processing can be offered.

The present invention also stores the relationship of languages, attributes, and extraction rules, and determines extraction rules that are to be used for the process, in accordance with this relationship. Hence, a further suitable extracting process can be realized.

According to the present invention, the document areas including character strings that have different writing orientations are subjected to extraction through division into document areas in accordance with writing orientations of character strings, combination of document areas that include characters of a large font, and also combination of document areas in accordance with the order of reading these document areas. Hence, a still further suitable extracting process can be realized.

The present invention also extracts document areas by dividing or combining them in compliance with rules depending on a target language after extracting document areas in compliance with rules independent from language differences. Hence, high accuracy can be achieved with a specific manner of area-dividing in accordance with the layout specifically used for the language, while the efficiency in layout analysis processing can be enhanced.

The present invention also enables the extracting process to be performed in accordance with languages only when it is necessary, offering an advantage of reducing the load on the extracting process.

Further, the present invention extracts document areas by dividing or combining them in compliance with rules that correspond to the attributes of a document area in addition to rules that correspond to an individual language. This further increases the accuracy in extracting document areas.

The present invention enables the extracting process to be performed in accordance with individual languages and attributes only when it is necessary, offering an advantage of reducing the load on the extracting process.

In addition, the present invention determines which language is being dealt with, based on the entire document image data, which means that the language determination is made on the basis of a wide range of information. Thus, the language is determined with high accuracy.

The present invention determines which language is being dealt with, for every document area. Thus, when characters of different languages are used in different document areas, highly accurate extraction of character areas can be achieved by performing suitable extraction for each document area.

Moreover, according to the present invention, because document areas are extracted in compliance with rules that correspond to the intended use of the document image data, document areas can be extracted suitably for the use.

In addition, the present invention enables the extracting process to be performed in accordance with the intended use of the document image data only when it is necessary, offering an advantage of reducing the load on the extracting process.

Further, the present invention makes a determination on at least one of writing orientation and font size, offering an advantage of suitably extracting document areas on the basis of such attributes.

Still further, according to the present invention, by recursively executing the extraction of the maximum white-block groups and the division of document areas, hierarchical processing is performed, as a process of extracting document areas, through recursive divisions from a rougher level to a finer level. Thus, an advantage of increased efficiency in layout analysis processing can be offered.

The present invention also stores the relationship of languages, attributes, and extraction rules, and determines extraction rules that are to be used for the process, in accordance with this relationship. Hence, a further suitable extracting process can be realized.

According to the present invention, the document areas including character strings that have different writing orientations are subjected to the extraction through division of document areas in accordance with the character strings of writing orientations, combination of document areas that include characters of a large font, and also combination of document areas in accordance with the order of reading these document areas. Hence, a still further suitable extracting process can be realized.

Finally, according to the present invention, a computer is incorporated to read the document image data so that any one of the above image processing methods can be realized with the computer, which offers the same advantages as each method does.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing device comprising:
a first area extracting computer processor unit configured to extract at least a first document area from document image data by dividing the document image data in units of a document area;
a language determining computer processor unit configured to determine a type of a language used in the document image data; and
a second area extracting computer processor unit configured to extract a second document area by dividing the first document area based on a rule corresponding to the type of the language determined by the language determining unit, and also configured to extract the second document area by combining the first document area with at least another different unit of a document area based on a rule corresponding to the type of the language determined by the language determining unit, wherein
the first area extracting computer processor unit includes
a white-block extracting computer processor unit configured to extract, from a document area unit of binary document image data, a maximum white-block group by
identifying a preliminary group of at least one white-block according to an evaluation function,
estimating a font size based on a distribution of black blocks in document area units, and
eliminating white-blocks from the preliminary group according to the estimated font size, and
a white-block dividing computer processor unit configured to divide the document area unit into a plurality of document area units by using the at least one white-block in the maximum white-block group extracted by the white-block extracting unit as separators,
wherein the white-block extracting computer processor unit is configured to extract the plurality of document area units divided from the document area unit and place them in a stack, and is further configured to extract another maximum white-block group from a document area unit at a top of the stack, and
wherein the first area extracting computer processor unit is configured to extract the maximum white-block group, divide the document area unit, and extract the plurality of document area units until the stack is empty.

2. The image processing device according to claim 1, further comprising:
an extraction determining computer processor unit configured to determine whether to perform an extraction of a document area appropriate for the type of the language, based on the type of the language determined by the language determining computer processor unit, from the first document area, wherein
the second area extracting computer processor unit is configured to extract the second document area when the extraction determining unit determines to perform the extraction.

3. The image processing device according to claim 2, wherein
the first area extracting computer processor unit is configured to extract a plurality of first document areas from the document image data,
the language determining unit determines the type of the language for each of the plurality of first document areas, and
the extraction determining unit determines whether to perform the extraction, based on the type of the language determined by the language determining unit, for each of the plurality of first document areas.

4. The image processing device according to claim 1, further comprising:
an attribute determining computer processor unit configured to determine an attribute of the first document area, wherein
the second area extracting computer processor unit is configured to extract a second document area by dividing the first document area or combining the first document area with at least another different unit of a document area based on a rule corresponding to the type of the language determined by the language determining computer processor unit and the attribute determined by the attribute determining unit.

5. The image processing device according to claim 4, further comprising:
an extraction determining computer processor unit configured to determine whether to perform an extraction of a document area appropriate for the type of the language and attribute, based on the type of the language determined by the language determining computer processor unit and the attribute determined by the attribute determining computer processor unit, from the first document area, wherein
the second area extracting computer processor unit is configured to extract the second document area when the extraction determining computer processor unit determines to perform the extraction.

6. The image processing device according to claim 4, wherein
the attribute determining computer processor unit determines at least one of a writing orientation and a font size of characters included in the first document area, as the attribute.

7. The image processing device according to claim 4, further comprising:
a computer memory that stores extraction-rule correspondence information in which a type of a language, an attribute, and an extraction rule are included in a corresponding manner, wherein the second area extracting computer processor unit is configured to extract the second document area based on an extraction rule of the extraction-rule correspondence information stored in the computer memory in which the type of the language determined by the language determining computer processor unit and the attribute determined by the attribute determining computer processor unit are included in a corresponding manner.

8. The image processing device according to claim 1, further comprising:
a third area extracting computer processor unit configured to extract a third document area by dividing the second document area or combining the second document area with at least another different unit of a document area based on a rule corresponding to a purpose of using the document image data.

9. The image processing device according to claim 1, wherein
the second area extracting computer processor unit is configured to extract the second document area by performing, on the first document area, at least one of division of a document area with character lines of different writing orientations into document areas in accordance with the writing orientations, combination of document areas with characters of large fonts, and combination of document areas in accordance with a reading order of the document areas.

10. A computerized image processing method comprising:
first area extracting including
using a computer processor unit to extract at least a first document area from document image data stored in a computer memory by dividing the document image data in units of a document area;
language determining including
determining, using the computer processor unit, a type of a language used in the stored document image data; and
second area extracting including
extracting, using the computer processor unit, a second document area by dividing the first document area based on a rule corresponding to the type of the language determined at the determining, wherein
the first area extracting includes
white-block extracting including extracting, from a document area unit of binary document image data, a maximum white-block group by
identifying a preliminary group of at least one white-block according to an evaluation function,
estimating a font size based on a distribution of black blocks in document area units, and
eliminating white-blocks from the preliminary group according to the estimated font size, and
white-block dividing including dividing the document area unit into a plurality of document area units by using the at least one white-block in the maximum white-block group extracted at the white-block extracting as separators,
wherein the white-block extracting includes extracting the plurality of document area units divided from the document area unit, placing them in a stack, and extracting another maximum white-block group from a document area unit at a top of the stack, and
wherein the first area extracting includes performing the extracting the maximum white-block group, the dividing the document area unit, and the extracting the plurality of document area units until the stack is empty.

11. The computerized image processing method according to claim 10, further comprising:
   extraction determining including
   determining whether to perform an extraction of a document area appropriate for the type of the language, based on the type of the language determined at the language determining, from the first document area, wherein
   the second area extracting includes extracting the second document area when it is determined to perform the extraction at the extraction determining.

12. The computerized image processing method according to claim 11, wherein
   the first area extracting includes extracting a plurality of first document areas from the document image data;
   the language determining includes determining the type of the language for each of the plurality of first document areas, and
   the extraction determining includes determining whether to perform the extraction, based on the type of the language determined at the language determining, for each of the plurality of first document areas.

13. The computerized image processing method according to claim 10, further comprising:
   attribute determining including
   determining an attribute of the first document area, wherein
   the second area extracting includes extracting a second document area by dividing the first document area or combining the first document area with at least another different unit of a document area based on a rule corresponding to the type of the language determined at the language determining and the attribute determined at the attribute determining.

14. The computerized image processing method according to claim 13, further comprising:
   extraction determining including
   determining whether to perform an extraction of a document area appropriate for the type of the language and attribute, based on the type of the language determined at the language determining and the attribute determined at the attribute determining, from the first document area, wherein
   the second area extracting includes extracting the second document area when it is determined to perform the extraction at the extraction determining.

15. The computerized image processing method according to claim 13, wherein
   the second area extracting includes extracting the second document area based on an extraction rule of extraction-rule correspondence information stored in a storing unit in which the type of the language determined at the language determining and the attribute determined at the attribute determining are included in a corresponding manner.

16. The computerized image processing method according to claim 10, further comprising:
   third area extracting including
   extracting a third document area by dividing the second document area or combining the second document area with at least another different unit of a document area based on a rule corresponding to a purpose of using the document image data.

17. The computerized image processing method according to claim 10, wherein
   the second area extracting includes extracting the second document area by performing, on the first document area, at least one of division of a document area with character lines of different writing orientations into document areas in accordance with the writing orientations, combination of document areas with characters of large fonts, and combination of document areas in accordance with a reading order of the document areas.

18. A computer program product comprising a computer readable non-transitory medium having computer readable program codes embodied in the computer readable non-transitory medium that when executed causes a computer to execute:
   first area extracting including
   extracting at least a first document area from document image data by dividing the document image data in units of a document area;
   language determining including
   determining a type of a language used in the document image data; and
   second area extracting including
   extracting a second document area by dividing the first document area based on a rule corresponding to the type of the language determined at the determining, wherein
   the first area extracting includes
   white-block extracting including extracting, from a document area unit of binary document image data, a maximum white-block group by
      identifying a preliminary group of at least one white-block according to an evaluation function,
      estimating a font size based on a distribution of black blocks in document area units, and
      eliminating white-blocks from the preliminary group according to the estimated font size, and
   white-block dividing including dividing the document area unit into a plurality of document area units by using the at least one white-block in the maximum white-block group extracted at the white-block extracting as separators,
   wherein the white-block extracting includes extracting the plurality of document area units divided from the document area unit, placing them in a stack, and extracting another maximum white-block group from a document area unit at a top of the stack, and
   wherein the first area extracting includes performing the extracting the maximum white-block group, the dividing the document area unit, and the extracting the plurality of document area units until the stack is empty.

* * * * *